US012570190B2

(12) United States Patent
Saucier et al.

(10) Patent No.: US 12,570,190 B2
(45) Date of Patent: Mar. 10, 2026

(54) INFANT TRANSPORT SYSTEM AND ASSEMBLY

(71) Applicant: Evenflo Company, Inc., Miamisburg, OH (US)

(72) Inventors: Shain A. Saucier, Charlotte, NC (US); Charles H. Keegan, Milton, MA (US); Zhang Meng, Suzhou (CN); Yang Xiaoyong, Suzhou (CN); Gao Xiang, Suzhou (CN); Lv Wenlong, Suzhou (CN); Feng Bo, Suzhou (CN)

(73) Assignee: Evenflo Company, Inc., Miamisburg, OH (US)

( * ) Notice: Subject to any disclaimer, the term of this patent is extended or adjusted under 35 U.S.C. 154(b) by 503 days.

(21) Appl. No.: 18/099,356

(22) Filed: Jan. 20, 2023

(65) Prior Publication Data

US 2024/0246462 A1     Jul. 25, 2024

(51) Int. Cl.
B62B 7/10          (2006.01)
B60N 2/28          (2006.01)
(Continued)

(52) U.S. Cl.
CPC ......... B60N 2/2848 (2013.01); B60N 2/2845 (2013.01); B62B 7/12 (2013.01); B62B 7/142 (2013.01); B62B 7/145 (2013.01)

(58) Field of Classification Search
CPC .. B62B 7/08; B62B 7/12; B62B 7/145; B62B 7/06; B62B 7/04; B62B 7/00; B62B 7/10;
(Continued)

(56) References Cited

U.S. PATENT DOCUMENTS

| 4,371,206 A | 2/1983 | Johnson, Jr. |
| 4,634,175 A | 1/1987 | Wise |

(Continued)

FOREIGN PATENT DOCUMENTS

| CN | 201124777 Y | 10/2008 |
| CN | 202686025 U | 1/2013 |

(Continued)

OTHER PUBLICATIONS

International Search Report and Written Opinion received for PCT Patent Application No. PCT/CN2023/115629, mailed on Oct. 24, 2023, 15 pages (11 pages of original copy and 4 pages of English Translation).

*Primary Examiner* — James M Dolak
(74) *Attorney, Agent, or Firm* — Shook, Hardy & Bacon L.L.P.

(57) ABSTRACT
A system to transport infant children is provided. The system includes a base, a chassis releasably coupled to the base, and an infant car seat releasably coupled to the combination of the chassis and the base. The infant car seat having a first handle operable in a first function to release the infant car seat from the combination of the chassis and the base. The chassis comprises a frame; a pair of rear legs pivotally coupled to the frame at a rear leg pivoting axis; and a pair of front legs, each front leg pivotally coupled to a respective rear leg at a front leg pivoting axis, wherein the rear legs and the front legs are retracted and proximate the frame in a first transport condition, and wherein the rear legs and the front legs are deployable away from the frame to a second transport condition.

18 Claims, 24 Drawing Sheets

(51) Int. Cl.
   *B62B 7/12*          (2006.01)
   *B62B 7/14*          (2006.01)

(58) Field of Classification Search
   CPC .......... B62B 7/14; B62B 7/142; B62B 7/105;
                    B62B 7/062; B62B 9/20; B62B 9/10;
                    B62B 9/102; B62B 9/12; B62B 9/203;
                    B62B 5/065; B62B 5/08; B62B 5/087;
                    B62B 5/06; B62B 5/067; B62B 2205/104;
                    B62B 2205/10; B60N 2/2848; B60N
                    2/2845; B60N 2/2842; B60N 2/28; B60N
                    2/26; B60N 2/2821
   See application file for complete search history.

(56)                References Cited

U.S. PATENT DOCUMENTS

| | | | |
|---|---|---|---|
| 4,685,688 A | | 8/1987 | Edwards |
| 4,733,909 A | | 3/1988 | Single et al. |
| 4,736,959 A | * | 4/1988 | Van Steenburg .... B60N 2/2848 |
| | | | 280/30 |
| 4,762,331 A | * | 8/1988 | Tucker ...................... B62B 7/12 |
| | | | 280/30 |
| 4,832,354 A | * | 5/1989 | LaFreniere .......... B60N 2/2848 |
| | | | 280/30 |
| 4,834,403 A | * | 5/1989 | Yanus ...................... B62B 7/12 |
| | | | 280/30 |
| 4,852,894 A | * | 8/1989 | Dyer ......................... B62B 7/12 |
| | | | 280/30 |
| 4,872,692 A | * | 10/1989 | Steenburg ................. B62B 7/12 |
| | | | 280/30 |
| 4,872,693 A | | 10/1989 | Kennel |
| 4,874,182 A | * | 10/1989 | Clark ......................... B62B 7/12 |
| | | | 280/47.38 |
| 4,878,680 A | | 11/1989 | Molnar |
| 4,896,894 A | | 1/1990 | Singletary |
| 4,902,026 A | | 2/1990 | Maldonado |
| 4,946,180 A | | 8/1990 | Baer |
| 4,986,599 A | | 1/1991 | Wise |
| 4,989,888 A | * | 2/1991 | Qureshi ................. B60N 2/286 |
| | | | 280/30 |
| 5,104,134 A | * | 4/1992 | Cone .................... B60N 2/2863 |
| | | | 280/30 |
| 5,133,567 A | * | 7/1992 | Owens ...................... B62B 7/12 |
| | | | 280/30 |
| 5,143,419 A | | 9/1992 | Tepper et al. |
| 5,149,113 A | * | 9/1992 | Alldredge ................. B62B 7/12 |
| | | | 280/30 |
| 5,230,523 A | | 7/1993 | Wilhelm |
| 5,318,311 A | | 6/1994 | Bofill |
| 5,360,221 A | * | 11/1994 | Chai .................... B60N 2/2839 |
| | | | 280/30 |
| 5,395,154 A | | 3/1995 | Wang |
| 5,398,951 A | * | 3/1995 | Ryu ........................ B62B 7/12 |
| | | | 280/47.38 |
| 5,403,022 A | | 4/1995 | Snider |
| 5,431,478 A | * | 7/1995 | Noonan .................... B62B 7/12 |
| | | | 297/130 |
| 5,478,096 A | * | 12/1995 | Ting ......................... B62B 7/10 |
| | | | 280/30 |
| 5,527,090 A | | 6/1996 | Cone, II |
| 5,673,924 A | * | 10/1997 | Demick ................... B62B 7/12 |
| | | | 280/30 |
| 5,772,279 A | * | 6/1998 | Johnson, Jr. ......... B60N 2/2848 |
| | | | 297/440.16 |
| 5,823,547 A | * | 10/1998 | Otobe ................. B60N 2/2839 |
| | | | 280/30 |
| 5,890,762 A | | 4/1999 | Yoshida |
| 5,893,606 A | | 4/1999 | Chiang |
| 5,961,180 A | | 10/1999 | Greger et al. |
| 6,070,890 A | | 6/2000 | Haut et al. |
| 6,183,044 B1 | | 2/2001 | Koyanagi et al. |
| 6,237,995 B1 | * | 5/2001 | Dierickx ................. B60N 2/286 |
| | | | 297/130 |

| | | | |
|---|---|---|---|
| 6,253,392 B1 | | 7/2001 | Conforti et al. |
| 6,296,259 B1 | | 10/2001 | Anderson |
| 6,416,272 B1 | | 7/2002 | Suehiro et al. |
| 6,511,105 B1 | | 1/2003 | Sakamoto |
| 6,561,577 B2 | | 5/2003 | Kelly |
| 6,655,702 B2 | | 12/2003 | Senger |
| 6,695,400 B2 | | 2/2004 | Washizuka et al. |
| 6,793,280 B2 | * | 9/2004 | Washizuka ........... B60N 2/2887 |
| | | | 297/217.2 |
| 6,910,696 B2 | | 6/2005 | Bargery et al. |
| 6,979,057 B2 | * | 12/2005 | Sedlack ............... B60N 2/2851 |
| | | | 297/250.1 |
| 6,983,986 B2 | | 1/2006 | Jane Santamaria |
| 6,986,518 B1 | * | 1/2006 | Besaw .................. B60N 2/2821 |
| | | | 280/47.38 |
| 7,040,694 B2 | * | 5/2006 | Sedlack .................. A47D 13/02 |
| | | | 280/47.38 |
| 7,104,603 B2 | | 9/2006 | Keegan et al. |
| 7,311,353 B1 | * | 12/2007 | Johnson ............... B60N 2/2848 |
| | | | 280/30 |
| 7,485,086 B2 | | 2/2009 | Dickie |
| 7,497,461 B2 | | 3/2009 | Emerson |
| 7,506,921 B1 | | 3/2009 | Sigmon et al. |
| 7,540,507 B1 | | 6/2009 | Kennedy |
| 7,543,886 B2 | * | 6/2009 | Gutierrez-Hedges ........................ |
| | | | B60N 2/2845 |
| | | | 280/30 |
| 7,597,396 B2 | * | 10/2009 | Longenecker ....... B60N 2/2845 |
| | | | 297/256.16 |
| 7,600,766 B2 | * | 10/2009 | Erskine ................ B60N 2/2845 |
| | | | 280/47.25 |
| 7,669,927 B1 | | 3/2010 | Zaid |
| 7,775,532 B2 | * | 8/2010 | Chen ...................... B62B 7/145 |
| | | | 280/47.38 |
| 7,988,230 B2 | | 8/2011 | Heisey et al. |
| 8,172,253 B2 | * | 5/2012 | Song ...................... B62B 7/145 |
| | | | 280/642 |
| 8,393,678 B2 | * | 3/2013 | Keegan .................... B60N 2/28 |
| | | | 297/256.16 |
| 8,434,781 B2 | * | 5/2013 | Mazar ................... B60N 2/2848 |
| | | | 280/30 |
| 8,469,389 B2 | | 6/2013 | Mazar et al. |
| 8,469,390 B2 | | 6/2013 | Mazar et al. |
| 8,523,218 B2 | | 9/2013 | Doucette et al. |
| 8,596,670 B2 | * | 12/2013 | di Carimate ........... B62B 7/142 |
| | | | 280/47.38 |
| 8,651,502 B2 | | 2/2014 | Winterhalter et al. |
| 8,801,028 B2 | | 8/2014 | Mazar et al. |
| 8,876,208 B2 | * | 11/2014 | Heisey ................. B60N 2/2827 |
| | | | 297/130 |
| 8,936,254 B2 | * | 1/2015 | Viana ................... B60N 2/2848 |
| | | | 280/30 |
| 8,998,242 B2 | * | 4/2015 | Wang ................... B60N 2/2848 |
| | | | 280/30 |
| 9,027,952 B2 | * | 5/2015 | Zhu ........................ B62B 7/145 |
| | | | 280/30 |
| 9,119,483 B1 | * | 9/2015 | Heisey ................. B60N 2/2821 |
| 9,168,940 B1 | | 10/2015 | Leszczak et al. |
| 9,227,536 B1 | | 1/2016 | Cary et al. |
| 9,227,648 B2 | * | 1/2016 | Sundberg ............... B62B 7/006 |
| 9,242,585 B2 | * | 1/2016 | Kozinski .............. B60N 2/2848 |
| 9,260,039 B1 | * | 2/2016 | Satterfield .............. B62B 7/145 |
| 9,308,839 B1 | * | 4/2016 | Gleckler .............. B60N 2/2821 |
| 9,326,900 B2 | | 5/2016 | Bancroft |
| 9,339,118 B2 | | 5/2016 | Gubitosi et al. |
| 9,371,017 B2 | | 6/2016 | Spence et al. |
| 9,469,222 B2 | | 10/2016 | Williams |
| 9,499,074 B2 | | 11/2016 | Strong et al. |
| 9,505,321 B2 | * | 11/2016 | Mazar .................. B60N 2/2845 |
| 9,592,846 B1 | * | 3/2017 | Hanson .................. B62B 7/068 |
| 9,603,464 B2 | | 3/2017 | Sclare et al. |
| 9,707,987 B2 | * | 7/2017 | Hanson .................. B62B 7/068 |
| 9,738,181 B1 | | 8/2017 | Termini |
| 9,764,755 B2 | | 9/2017 | D'Anastasi |
| 9,868,456 B2 | | 1/2018 | Stiba et al. |
| 10,035,437 B1 | * | 7/2018 | Ballard ................ B60N 2/2842 |
| 10,052,981 B2 | * | 8/2018 | Wright ................ B60N 2/2845 |
| 10,058,192 B2 | | 8/2018 | Williams et al. |

(56) References Cited

U.S. PATENT DOCUMENTS

| | | | |
|---|---|---|---|
| 10,427,558 B1 | 10/2019 | Dickens | |
| 10,710,478 B2 | 7/2020 | Reaves et al. | |
| 10,933,778 B1 * | 3/2021 | Hinson | B60N 2/2821 |
| 11,267,376 B2 * | 3/2022 | Churilla | B60N 2/2845 |
| 11,472,316 B2 * | 10/2022 | Olfers | B60N 2/2887 |
| 11,584,267 B2 | 2/2023 | Longenecker et al. | |
| 11,723,477 B2 | 8/2023 | Rogers et al. | |
| 11,932,300 B1 * | 3/2024 | Jablonski | B62B 7/066 |
| 11,958,524 B1 * | 4/2024 | Saucier | B60N 2/2848 |
| 11,993,301 B2 * | 5/2024 | Cheng | B62B 7/142 |
| 12,371,089 B2 * | 7/2025 | Saucier | B60N 2/2848 |
| 12,397,689 B2 * | 8/2025 | Saucier | B60N 2/2848 |
| 2002/0060444 A1 | 5/2002 | Cote | |
| 2003/0015894 A1 | 1/2003 | Bargery et al. | |
| 2004/0173997 A1 | 9/2004 | Voll | |
| 2010/0019547 A1 * | 1/2010 | Gray | B60N 2/2845 |
| | | | 280/30 |
| 2010/0225150 A1 | 9/2010 | Duncan et al. | |
| 2011/0163518 A1 | 7/2011 | Song | |
| 2012/0032418 A1 | 2/2012 | Doucette et al. | |
| 2012/0032420 A1 | 2/2012 | Mazar et al. | |
| 2012/0119457 A1 * | 5/2012 | Williams | B62B 7/083 |
| | | | 280/30 |
| 2013/0229033 A1 * | 9/2013 | Lee | B62B 7/12 |
| | | | 297/130 |
| 2014/0265255 A1 | 9/2014 | Wang | |
| 2016/0029813 A1 * | 2/2016 | Kast | B60N 2/2848 |
| | | | 280/30 |
| 2017/0240072 A1 | 8/2017 | Wright | |
| 2018/0009341 A1 | 1/2018 | Carlile | |
| 2018/0029625 A1 | 2/2018 | Ruggiero et al. | |
| 2020/0269733 A1 | 8/2020 | Heisey et al. | |
| 2021/0009012 A1 | 1/2021 | Olfers et al. | |
| 2022/0346569 A1 | 11/2022 | Liu | |
| 2022/0355713 A1 | 11/2022 | Longenecker et al. | |
| 2023/0014310 A1 | 1/2023 | Longenecker et al. | |
| 2023/0382446 A1 | 11/2023 | Crossgrove et al. | |
| 2024/0239248 A1 | 7/2024 | Saucier et al. | |
| 2024/0239249 A1 | 7/2024 | Saucier et al. | |
| 2024/0239250 A1 | 7/2024 | Saucier et al. | |
| 2024/0239396 A1 | 7/2024 | Saucier et al. | |
| 2024/0239398 A1 | 7/2024 | Saucier et al. | |
| 2024/0246593 A1 | 7/2024 | Saucier et al. | |
| 2024/0246594 A1 | 7/2024 | Saucier et al. | |
| 2024/0246595 A1 | 7/2024 | Saucier et al. | |
| 2024/0246596 A1 | 7/2024 | Saucier et al. | |
| 2024/0246597 A1 | 7/2024 | Saucier et al. | |

FOREIGN PATENT DOCUMENTS

| | | |
|---|---|---|
| CN | 204687877 U | 10/2015 |
| CN | 207257442 U | 4/2018 |
| CN | 216861236 U | 7/2022 |
| CN | 115402164 A | 11/2022 |
| CN | 115402165 A | 11/2022 |
| CN | 218558646 U | 3/2023 |
| CN | 218750429 U | 3/2023 |
| EP | 1918155 A2 | 5/2008 |
| WO | 2024/046335 A1 | 3/2024 |

* cited by examiner

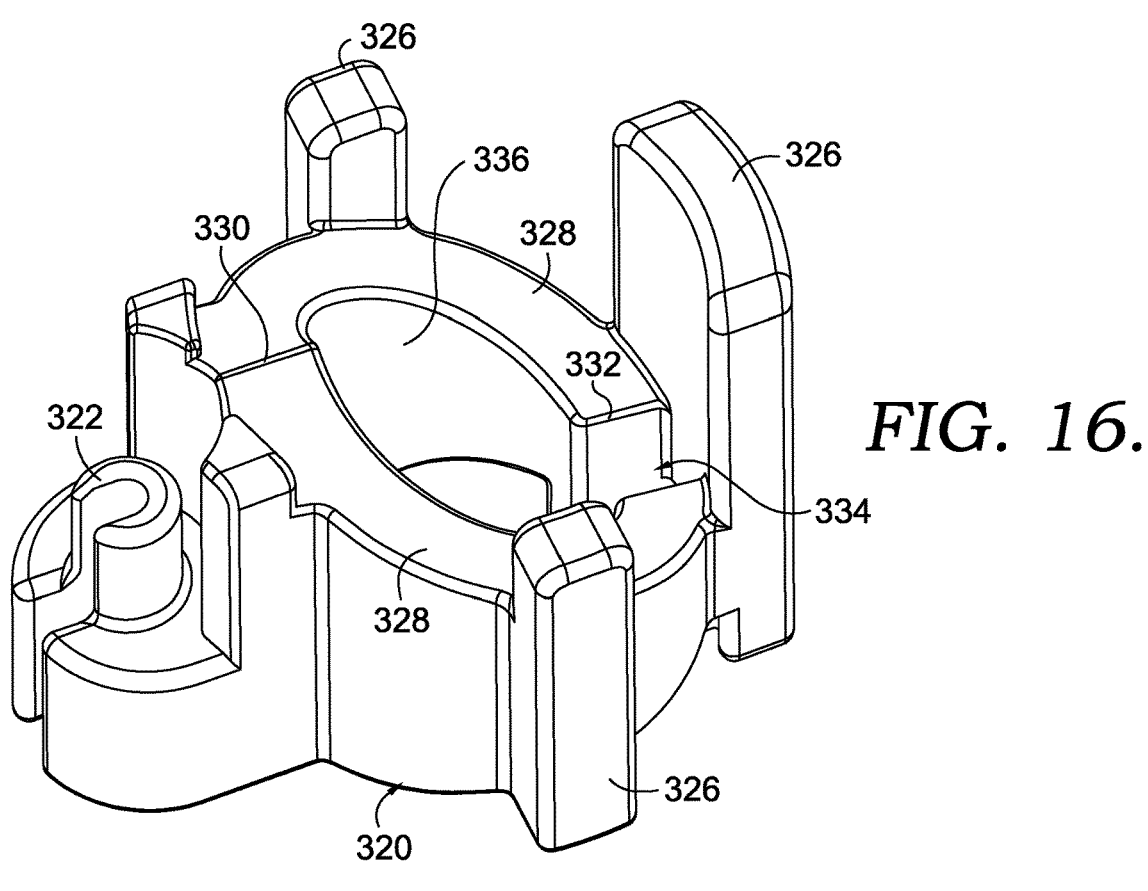
*FIG. 16.*
*FIG. 17.*
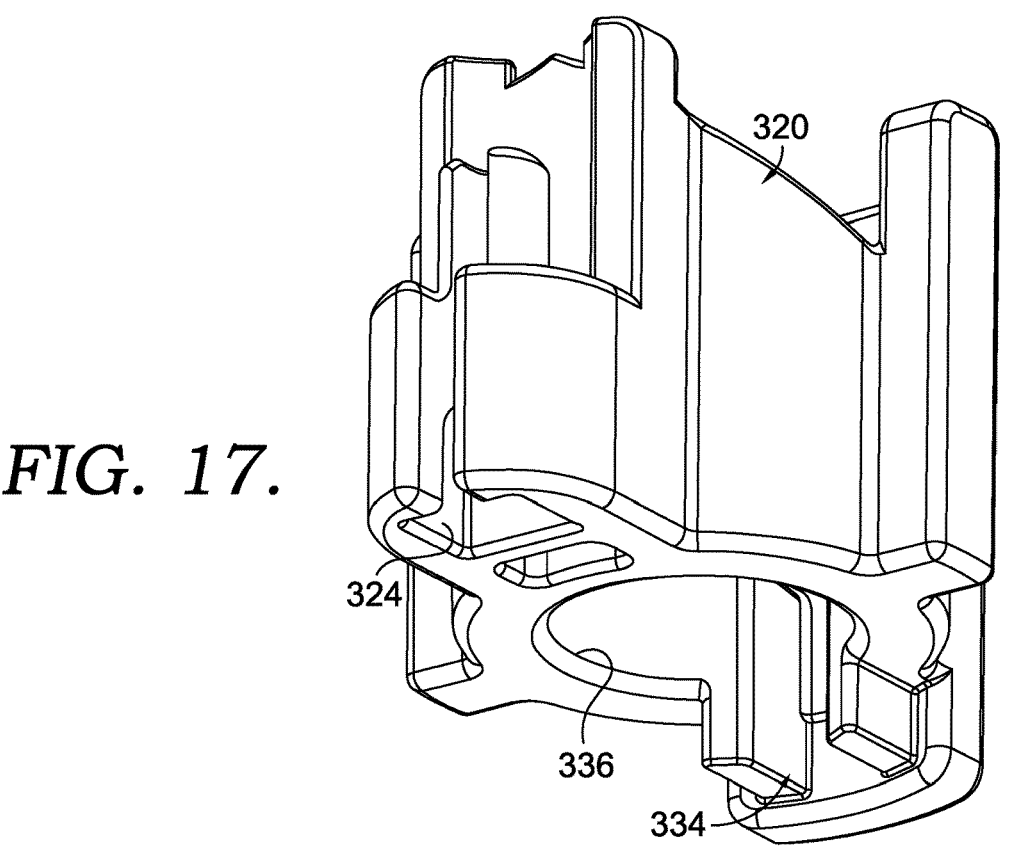

INFANT TRANSPORT SYSTEM AND ASSEMBLY

TECHNICAL FIELD

The present disclosure generally relates to a modular, convertible infant transport system and an assembly.

BACKGROUND

Traditionally, infants may be transported in infant carriers, which may also be a part of an infant car seat or as a part of a stroller (among other modes of transport). There have been some attempts to develop systems that may be used as a car seat, an infant carrier and a stroller, but these systems, to date, suffer from a number of disadvantages and drawbacks, such as not offering a desired level of optional configurations.

BRIEF DESCRIPTION OF THE DRAWINGS

The drawings described herein are for illustrative purposes only, are schematic in nature, and are intended to be exemplary rather than to limit the scope of the disclosure.

FIG. 16 is an enlarged perspective view of a cam sleeve, in accordance with aspects herein;

FIG. 17 is a view of the cam sleeve of FIG. 16, from a different perspective;

DETAILED DESCRIPTION

Figure 1:
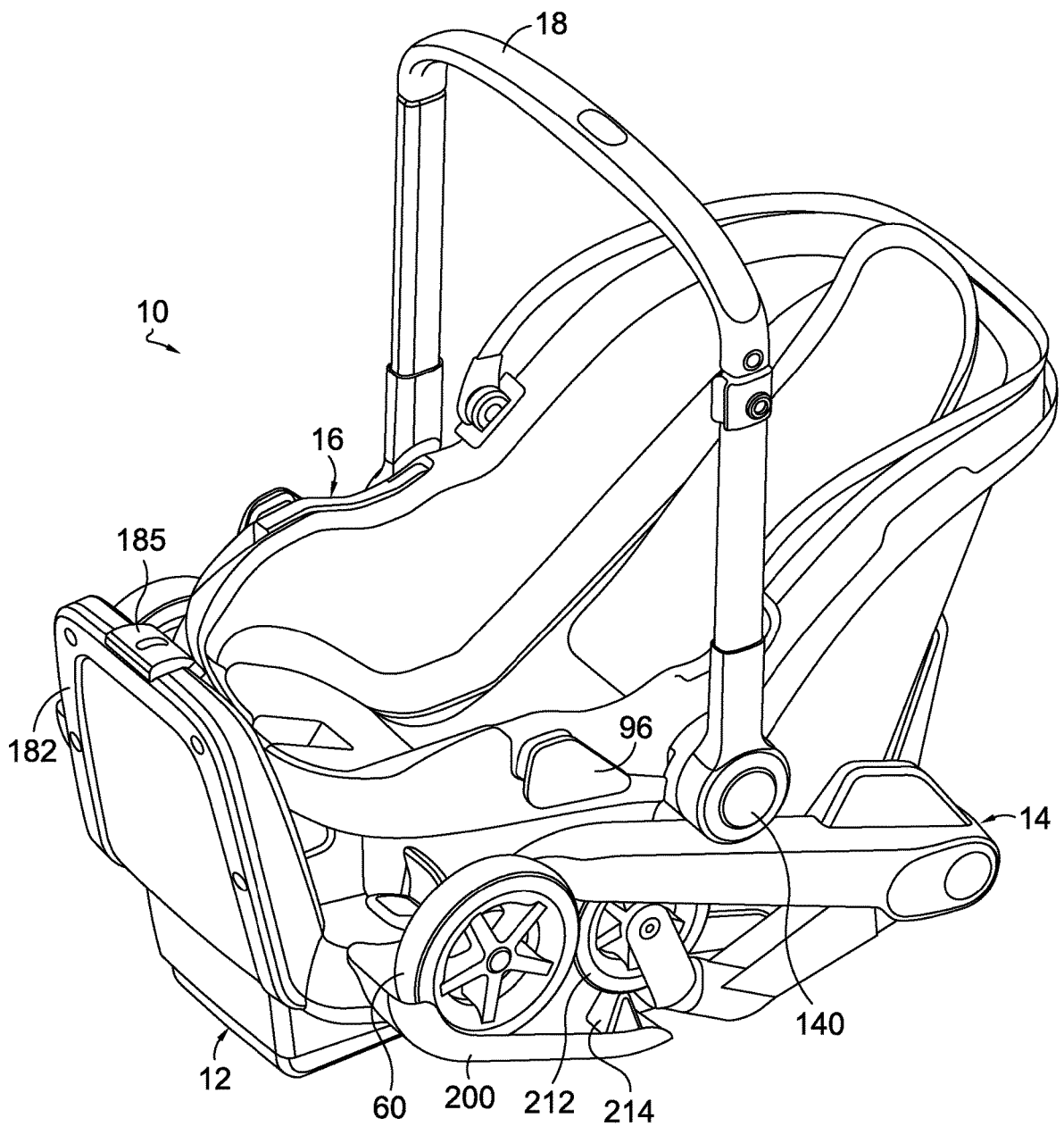
FIG. 1 is a perspective view of an infant transport system in a first transport condition.

In an example, an infant transport system is provided. The infant transport system may comprise: a chassis having a frame; a pair of rear legs pivotally coupled to the frame at a rear leg pivoting axis; and a pair of front legs, each front leg pivotally coupled to a respective rear leg at a front leg pivoting axis, wherein the rear legs and the front legs are retracted and proximate the frame in a first transport condition, and wherein the rear legs and the front legs are deployable away from the frame to a second transport condition. The system may also comprise an infant car seat coupled to the chassis.

The above features and advantages and other features and advantages of the present teachings are readily apparent from the following detailed description of the modes for carrying out the present teachings when taken in connection with the accompanying drawings.

In some aspects, at a high-level, an infant transport system is provided that offers increased flexibility in the usable configurations of the system. The infant transport system, in some aspects, includes a base and an independent chassis that is releasably coupled to the base via a first release mechanism. The infant transport system also includes an infant car seat, (throughout this specification, the infant car seat may also be referred to as a shell), that is releasably coupled to the chassis and the base via a second release mechanism. In a first transport condition, the chassis is intermediate the base and the infant car seat. In this first transport condition, the assembly of the base, the chassis and the infant car seat are usable within a vehicle to transport an infant. The chassis and the infant car seat are releasable from the base, as a combined unit, upon operation of the first release mechanism. In this condition, the front legs and rear legs of the chassis are deployable away from the frame of the chassis, such that the assembly is usable as an infant stroller. Additionally, in some aspects, the infant car seat is releasable from the combined unit of the base and the chassis upon operation of the second release mechanism. In this condition, the infant car seat is usable as an infant carrier. Other features and details of operation of the infant transport system are described below in connection with the drawing figures.

Figure 2:
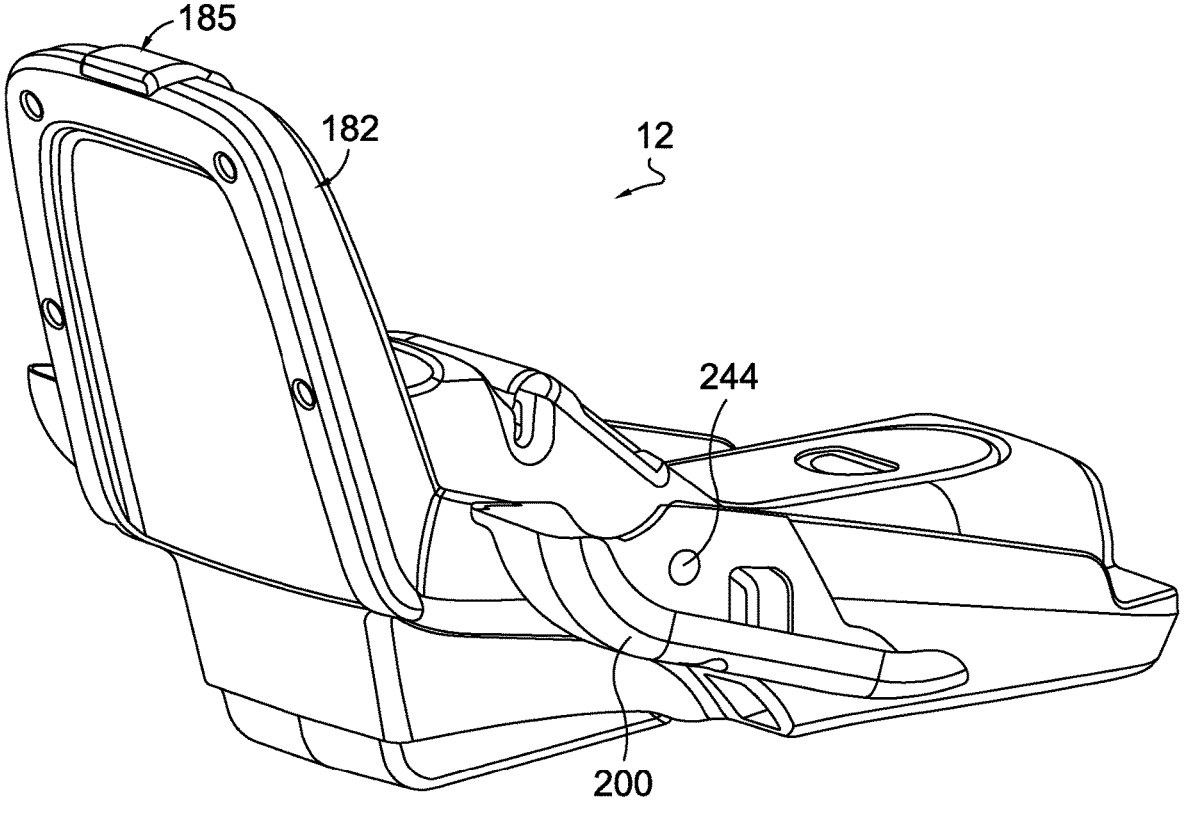
FIG. 2 is a perspective view of the base of the infant transport system decoupled from the chassis and the shell.
Figure 5:
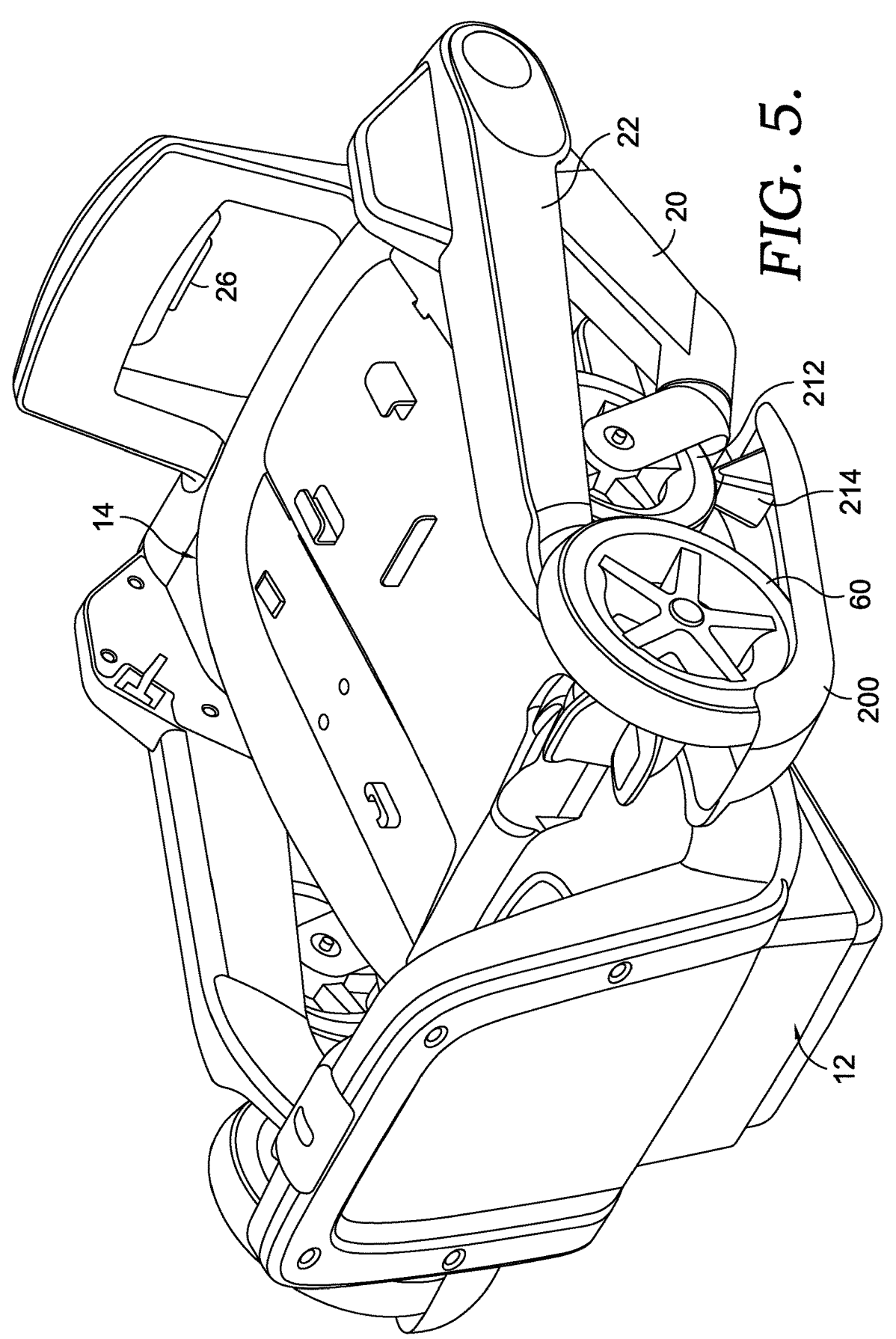
FIG. 5 is a perspective view of the chassis and the base of the infant transport system with the shell decoupled from the chassis and the base.
Figure 6:
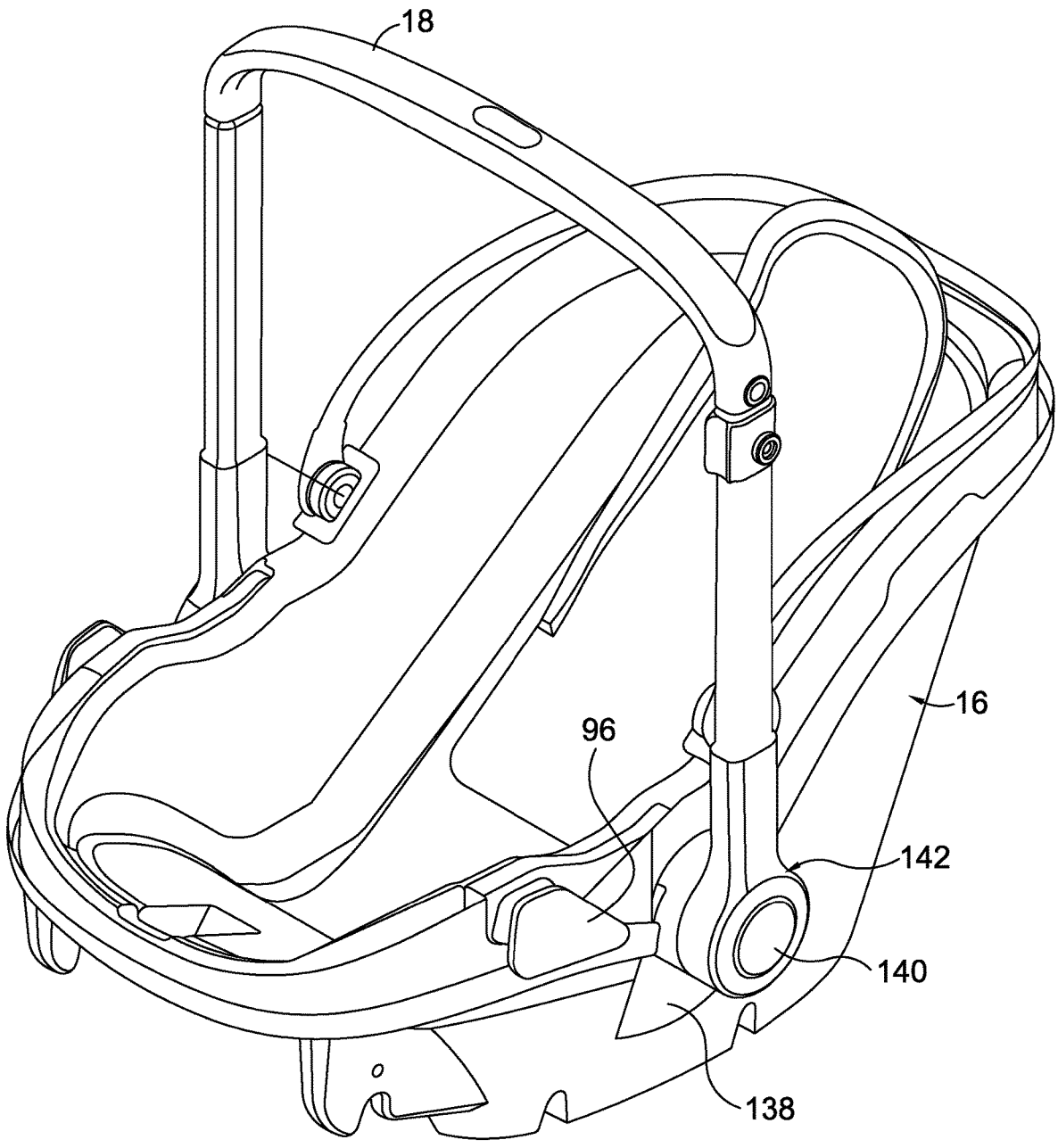
FIG. 6 is a perspective view of the shell of the infant transport system decoupled from the chassis and the base.
Figure 7:
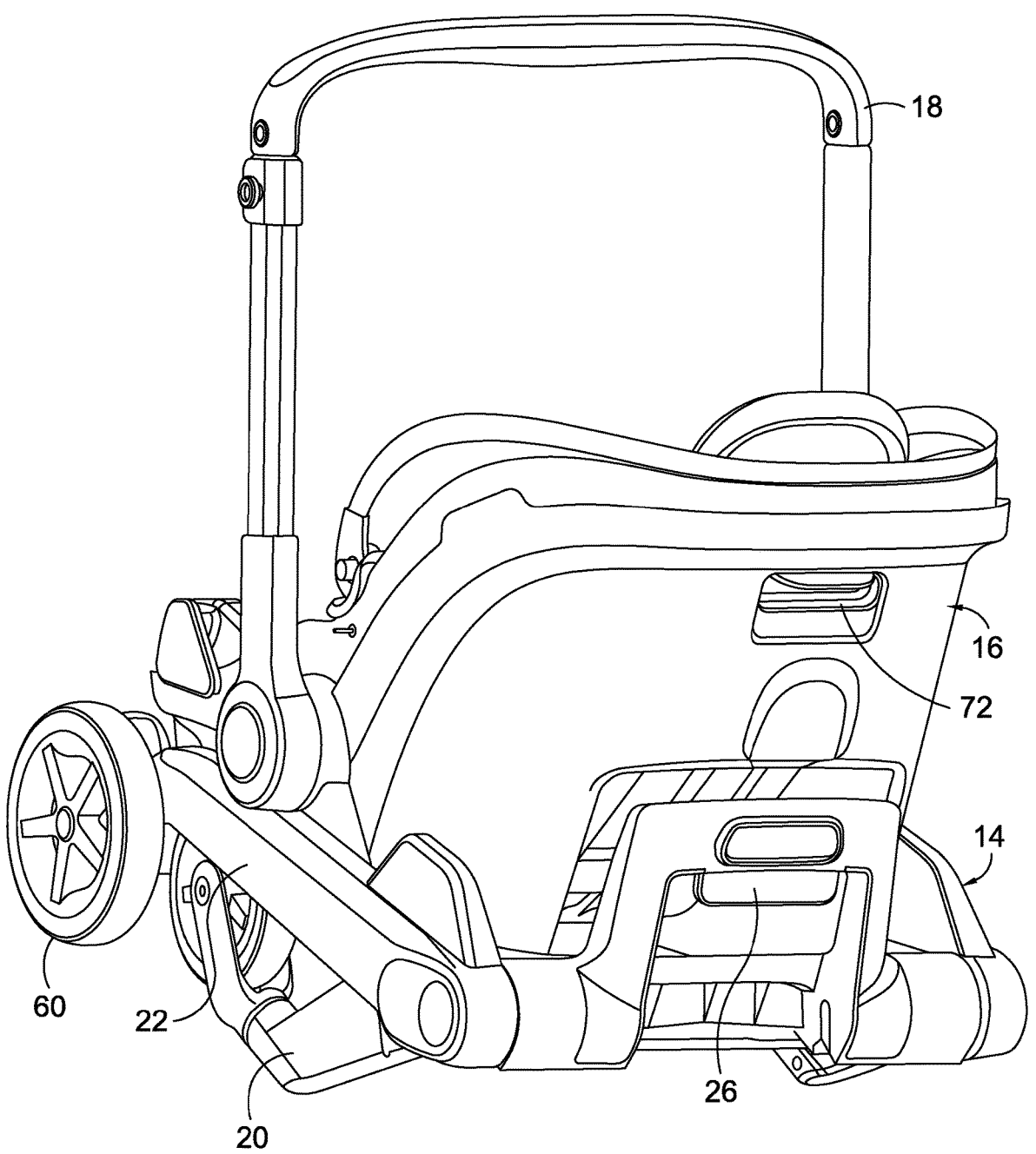
FIG. 7 is a view similar to FIGS. 3A and 3B from a different viewpoint.

Referring to the drawings, wherein like reference numbers refer to like components, FIGS. 1-25 depict an infant transport system, or assembly, 10. The infant transport system 10, in some aspects, includes a base 12, an independent chassis 14 releasably coupled to the base 12, and an infant car seat, or shell, 16. The base 12, the chassis 14 and the shell 16 are shown coupled together in FIG. 1 in a first transport condition, and is one example of the system 10 usable to secure an infant in a vehicle. While not shown to make other components more visible, the shell 16 is equipped with padding and an infant safety harness system. As shown in FIG. 2, the chassis 14 and the shell 16 are releasable from the base 12. The base 12 may be installed in a vehicle and secured in place using anchoring straps or the seat belt of the vehicle. Once the base 12 is installed in the vehicle, the combined unit of the chassis 14 and the shell 16 may be releasably coupled to the base 12, as further described below. FIG. 3 depicts the chassis 14 coupled to the shell 16 and removed from the base 12. In this transport condition, the assembly of the shell 16 and the chassis 14 is usable as an infant carrier (using a carrier handle 18), and may also be installed in a vehicle and used as a car seat as described in further detail below. As shown in FIG. 4, the chassis 14 includes a pair of front legs 20 that are each pivotally coupled to a respective one of a pair of rear legs 22 which are, in turn, pivotally coupled to the chassis 14. The front legs 20 and rear legs 22 are deployable from the transport condition shown in FIG. 3 to the transport condition shown in FIG. 4, such that the assembly of the chassis 14 and shell 16 are usable as a stroller. In this transport condition, the handle 18 is rotatable and extendable for use in pushing the stroller. As depicted in FIGS. 5 and 6, the shell 16 is also releasable from the combined unit of the base 12 and the chassis 14. In the transport condition shown in FIG. 6, the shell 16 is usable as an infant carrier and can also be secured within a vehicle and usable as a car seat. The infant transport system 10 thus allows for greater flexibility in the various transport conditions as is further described in detail below.

Figure 8:
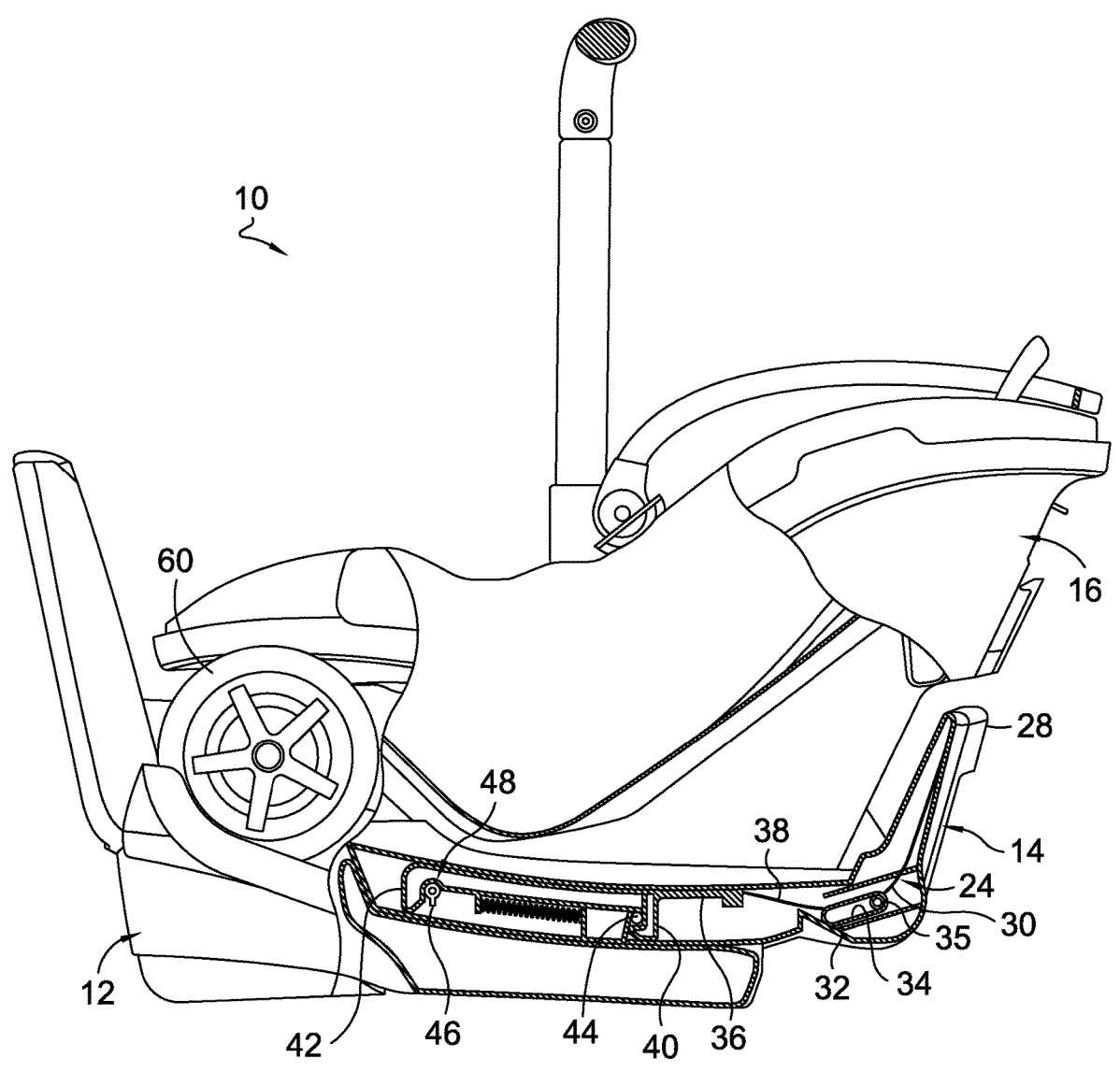
FIG. 8 is a side view of the infant transport system in partial cross-section.
Figure 9:
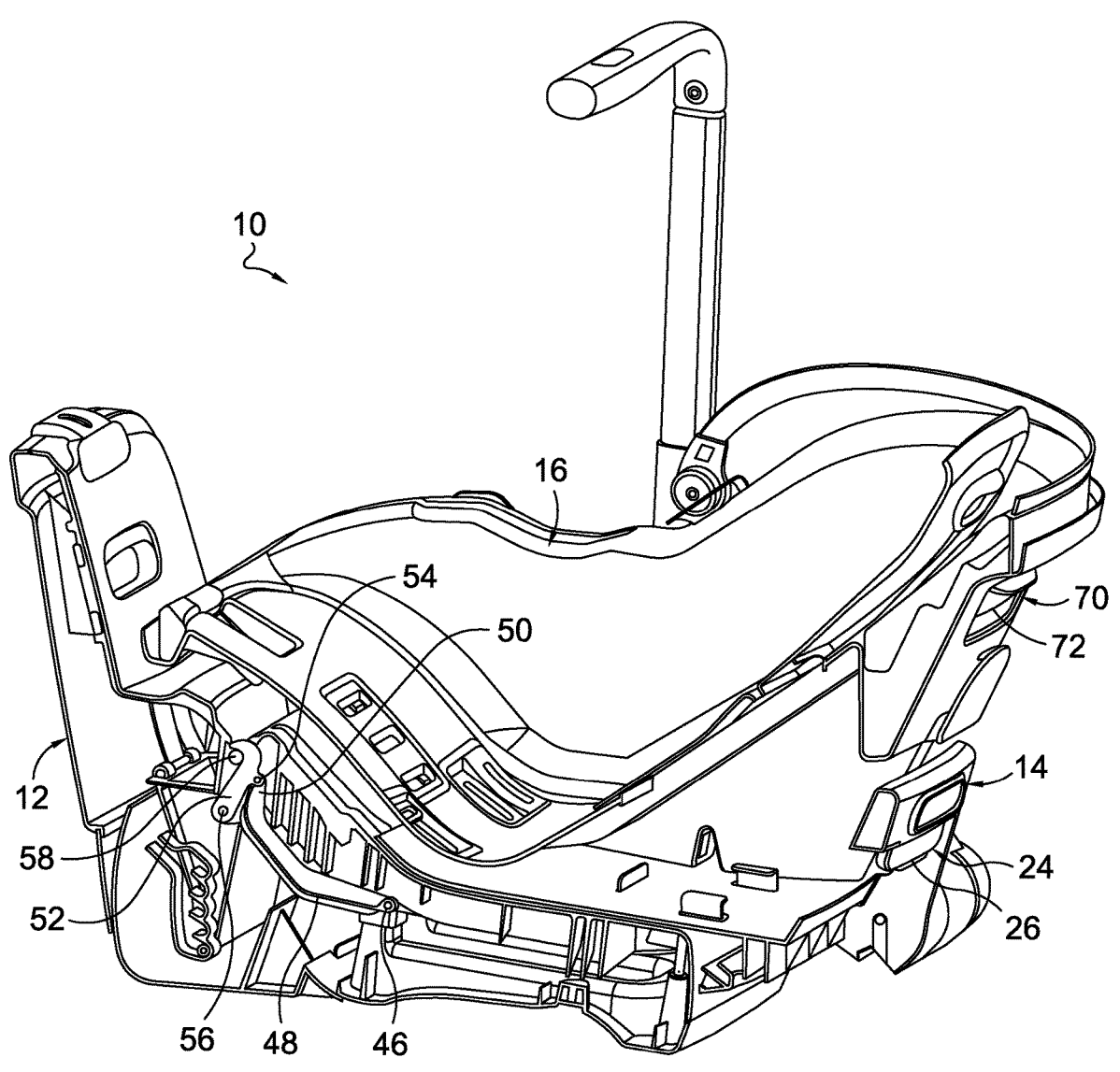
FIG. 9 is a perspective cross-section view of the infant transport system of FIG. 1.

As shown in FIGS. 8-9, a first release mechanism 24 is distributed between the chassis 14 and the base 12. The first release mechanism 24 includes a release handle 26 movably disposed on a frame 28 of the chassis 14. In some aspects, the release handle 26 is movably coupled to the frame 28, allowing the release handle 26 to move generally upwardly and downwardly. The release handle 26 is coupled to a cable 30 that extends downwardly from the handle 26 within the interior of the frame 28. The end of cable 30 opposite the handle 26 is coupled to a carriage 32 having a slot 34 formed therein. The carriage 32 is slidable along a stationary rod 35 fixed to the chassis 14 and that extends through the slot 34. The carriage 32 moves rearwardly along the rod 35 when the handle 26 is pulled upwardly. As best seen in FIG. 8, the carriage 32 is coupled to a lever 36 that moves as the carriage 32 moves. In some aspects, the carriage 32 is coupled to the lever 36 via a separate cable 38. In other aspects, the cable 38 is integrally formed as a part of lever 36 or as a part of carriage 32. The cable 30 and the cable 38 (along with other cables discussed herein) may be made from a flexible material, and in some aspects, are made from a steel wire or a plastic material. The lever 36 includes a downwardly extending hook 40 and a downwardly extending finger 42. The hook 40 releasably engages a post 44 that is fixed to the base 12. In some aspects, the post 44 is a U-bolt that is fastened to the base 12. As the handle 26 is pulled upwardly, the hook 40 is moved rearwardly to release the hook 40 from the post 44. The finger 42 engages one end 46 of an arm 48 that is slidably held within the base 12. The end 46 of arm 48 has a portion that extends outwardly and is exposed on the exterior of the base 12. As best seen in FIG. 9, the end 46 has another portion that is within the interior of the base 12. The arm 48 extends from the end 46 upwardly to a distal end 50 that is pivotally coupled to a hook 52 at pivot point 54. The hook 52 is also pivotally coupled to the base 12 at pivot point 56. The hook 52 releasably engages a rod 58 on the chassis 14. In some aspects, the rod 58 on the chassis 14 serves as an axle for wheels 60 on the end of rear legs 22. In other aspects, the rod 58 is discontinuous and does not function as an axle.

The first release mechanism 24 is operable, in a first function, to release the chassis 14 and the shell 16, as a combined unit, from the base 12. As the handle 26 is pulled upwardly, the cable 30 acts to move the carriage 32 and the lever 36 rearwardly, releasing the hook 40 from the post 44 on the base 12. As the lever 36 moves rearwardly, the finger 42 engages the first end 46 of the arm 48, moving the arm 48 rearwardly. This in turn rotates the hook 52 about pivot point 56, releasing the hook 52 from the rod 58. As these two attachment points (hook 40/post 44 and hook 52/rod 58) release, the chassis 14 and the shell 16 are releasable as a combined unit from the base 12. While only one side of the first release mechanism 24 is shown and described above, it should be understood that the handle 26 may be coupled to a similar series of components (cable 30, carriage 32, lever 36, cable 38, arm 48 and hook 52) on each side of the chassis 14.

Figure 10:
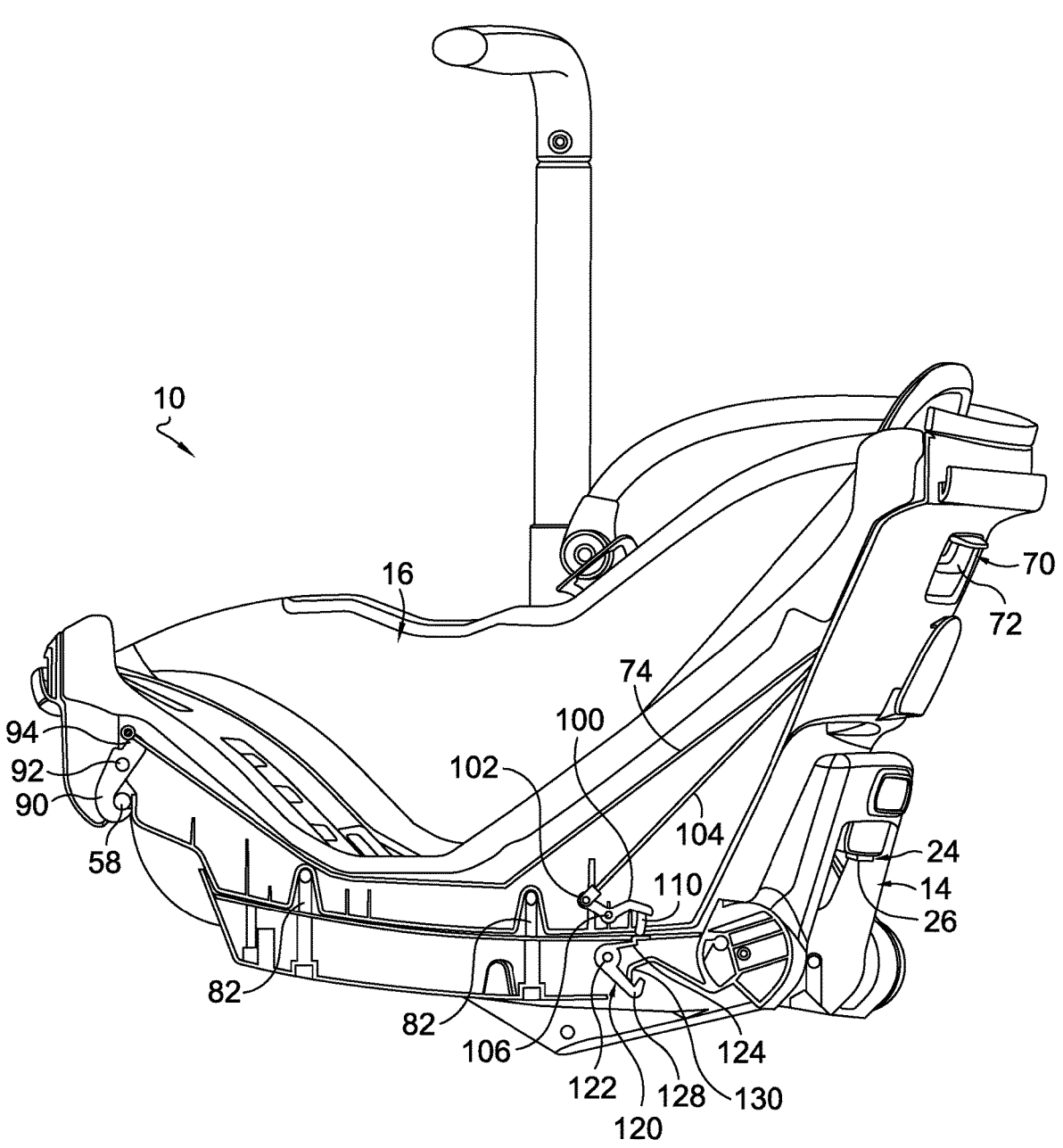
FIG. 10 is a cross-section view of the chassis and the shell of the infant transport system decoupled from the base.
Figure 11:
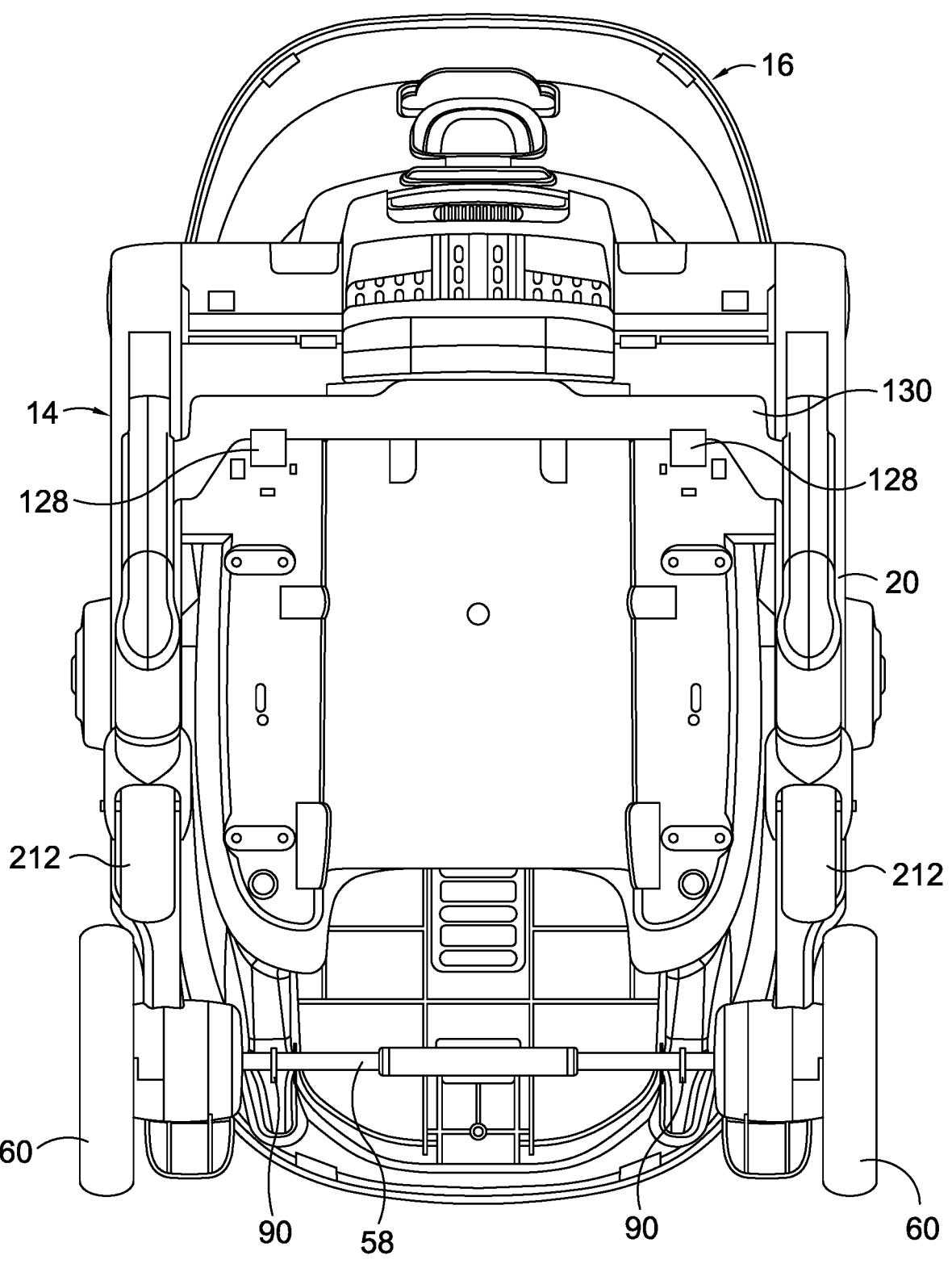
FIG. 11 is a bottom plan view of the chassis and the shell of the infant transport system decoupled from the base.
Figure 12:
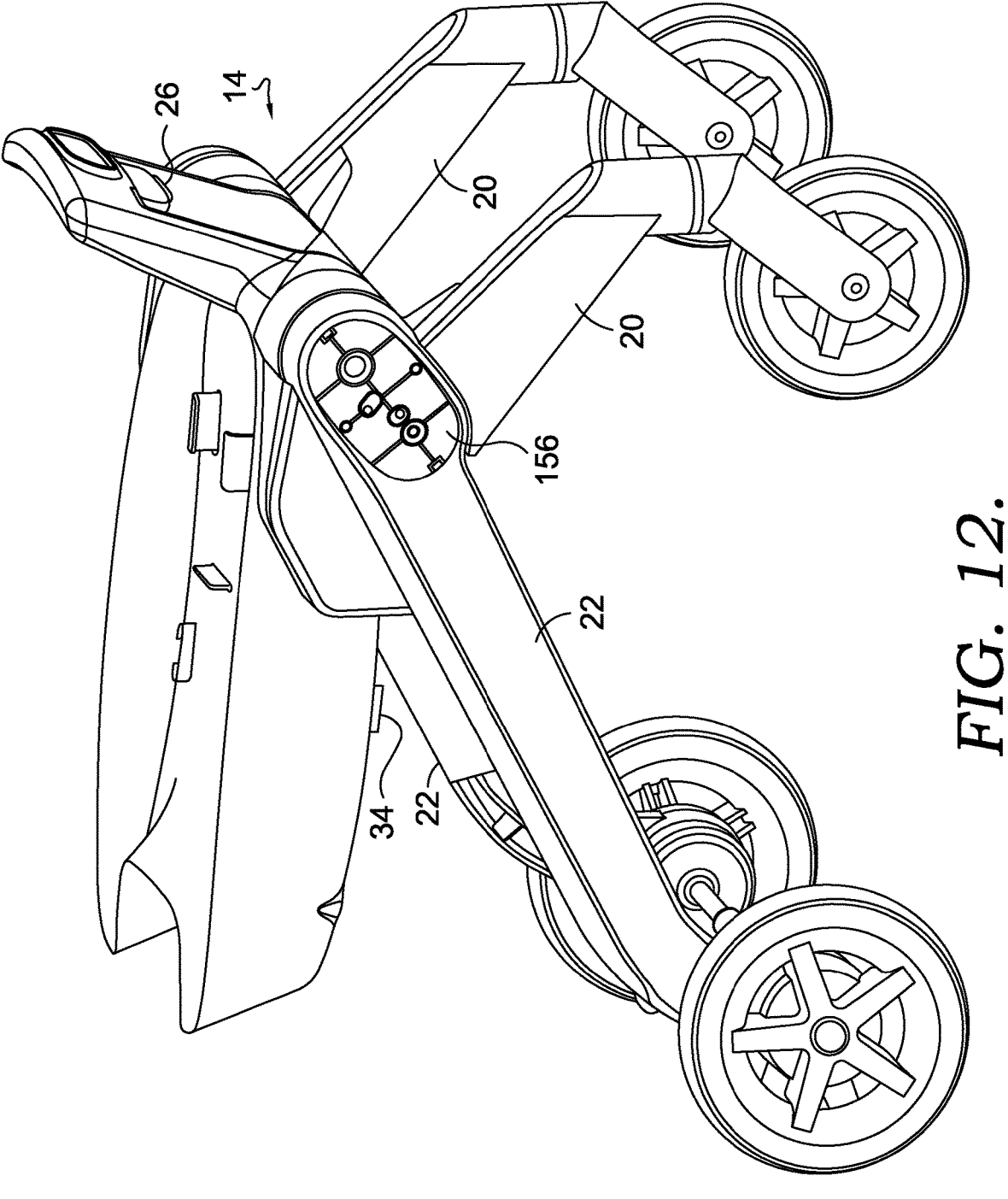
FIG. 12 is a perspective view of the chassis of the infant transport system, shown with the legs deployed and with some parts broken away.
Figure 24:
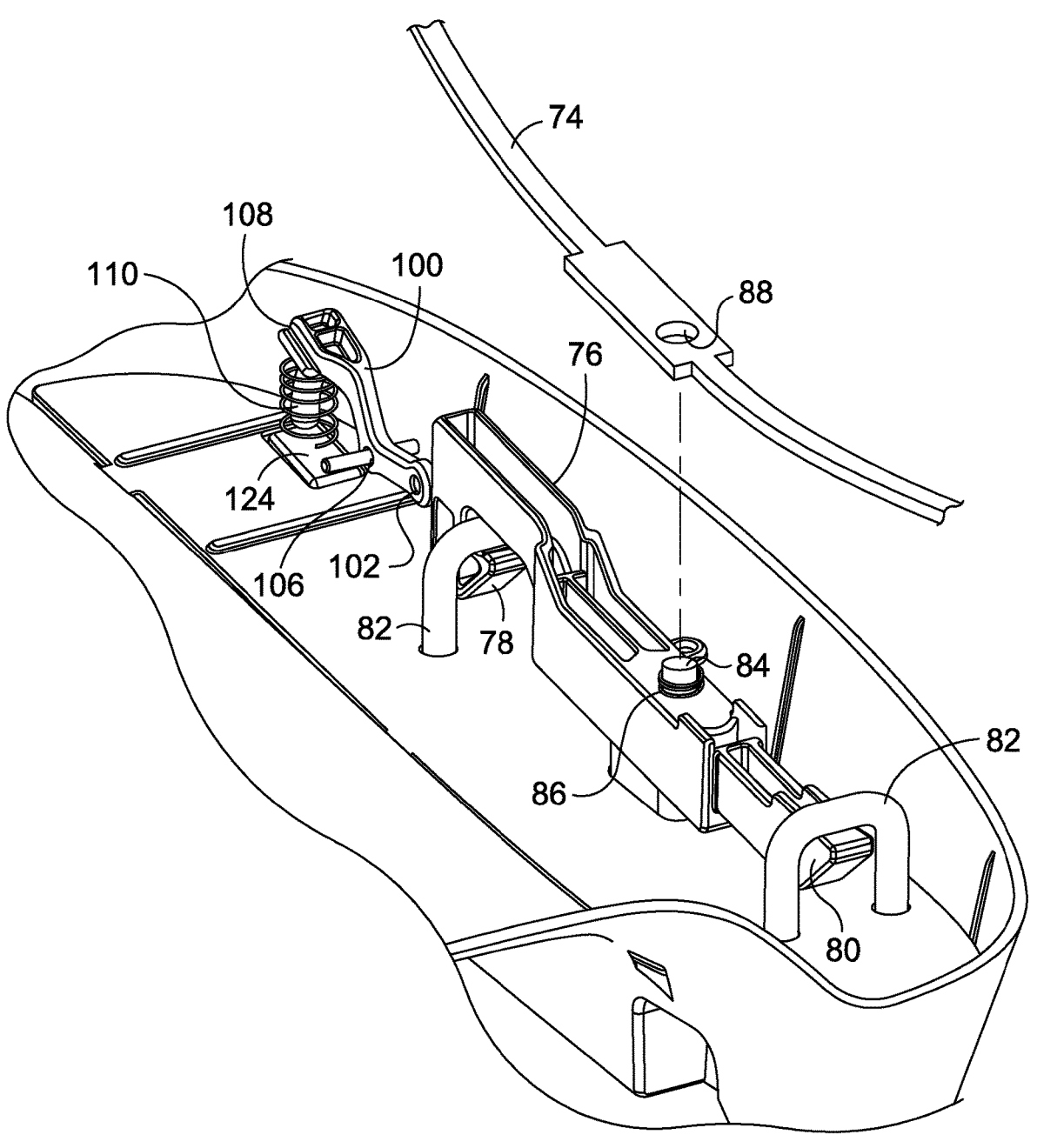
FIG. 24 is a partial exploded view of the interior of the shell of the infant transport system.
Figure 25:
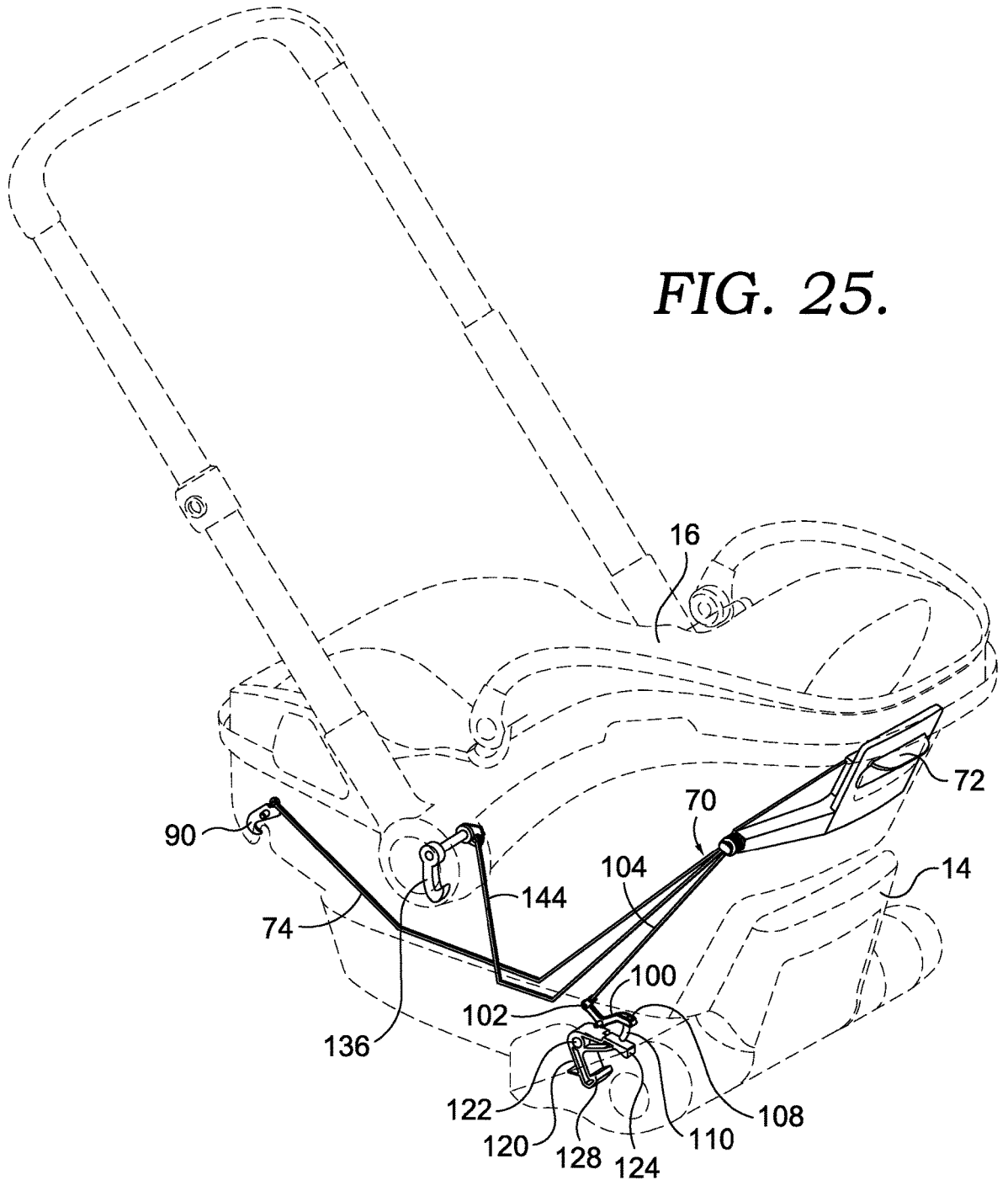
FIG. 25 is a view with certain components shown in an environment and showing the cabling of the second release mechanism.

A second release mechanism 70 is operable, in a first function, to release the shell 16 from the combined unit of the base 12 and the chassis 14. As best seen in FIG. 10, the second release mechanism 70 includes a release handle 72 movably disposed within the shell 16. As best seen in FIGS. 24 and 25, the handle 72 is selectively coupled, via a cable 74, to a release lever 76 positioned within the shell 16. The lever 76 includes a downwardly extending hook 78 and a front finger 80. As best seen in FIG. 24, both the hook 78 and the finger 80 releasably engage a pair of upwardly extending U-bolts 82 that are coupled to the chassis 14. The lever 76 is only operational when the chassis 14 is coupled to the base 12 (so that the shell 16 is removable from the combined unit of the chassis 14 and the base 12, but the shell 16 is not removable from the chassis 14 when the chassis 14 is decoupled from the base 12). To achieve this selective operation of the lever 76, the chassis 14 includes a spring-loaded pin 84. The pin 84 is moved upwardly and into the chassis 14 by the base 12 when the chassis 14 is coupled to the base 12. Conversely, when the chassis 14 is decoupled from the base 12, the pin 84 moves downwardly, biased by a spring. When the pin 84 moves upwardly (with the chassis 14 on the base 12), the pin 84 moves through a hole 86 in the lever 76 and into a corresponding hole 88 in the cable 74. With the pin 84 coupling the lever 76 and the cable 74, an upward force on the handle 72 is translated into a rearward movement of the lever 76, releasing the hook 78 and the finger 80 from engagement with the U-bolts 82. This action releases the central section of the shell 16 from the chassis 14. While not shown, the shell 16 may include a cover over the section of cable 74 having the hole 86 to ensure the pin 84 extends into the cable 74 (the cover acts to maintain cable 74 in close proximity to the lever 76).

In some aspects, as best seen in FIGS. 10 and 25, the cable 74 extends forwardly to engage another hook 90 that is pivotally coupled inside the shell 16 at pivot point 92. The hook 90 selectively engages a portion of the rod 58, as best seen in FIG. 10. The opposite end of the hook 90 has a tab 94 that is coupled to a terminal end of the cable 74. With this connection, an upward force on the handle 72 is translated to a rotational movement of the hook 90, releasing the hook 90 from the rod 58. This action releases the rearward end of the shell 16 from the chassis 14. Therefore, when the shell 16 and chassis 14 are coupled to the base 12, the second release mechanism 70 is operable, in a first function through handle 72, to release the shell 16 from the combined unit of the chassis 14 and the base 12, allowing the shell 16 to be used as an infant carrier, without the chassis 14 and the base 12 (as shown in FIG. 6). The shell 16 is also usable as an infant car seat and can be secured in place within a vehicle with the provided vehicle seat belts. In some aspects, the shell 16 is provided with seat belt anchors 96 to facilitate such a connection.

In some aspects, the second release mechanism 70 is operable in a second function to deploy the front legs 20 and the rear legs 22 below the chassis 14 to allow use of the combined unit of the chassis 14 and the shell 16 as a stroller (transitioning from the transport condition shown in FIG. 3 to the transport condition shown in FIG. 4). To achieve this second function, as best seen in FIGS. 10, 24 and 25, the second release mechanism 70 also includes a pivot arm 100 having a first end 102 that is coupled to the release handle 72 via a cable 104. In some aspects, the cable 104 may be integrally formed with the cable 74, and in other aspects, the cable 104 is a separate component from cable 74. The pivot arm 100 is pivotally coupled within the shell 16 at pivot point 106. A second end 108 of the arm 100 includes a downwardly extending plunger 110 that is positioned to selectively extend from the interior of the shell 16. As the handle 72 is moved upwardly, the cable 104 moves the first end 102 upwardly (rotating about pivot point 106), causing the plunger 110 to move downwardly and outside of the shell 16. As best seen in FIG. 25, when the shell 16 is coupled to the chassis 14, the plunger 110 is positioned to interact with a release hook 120 that is pivotally coupled within chassis 14 at pivot point 122. The release hook 120 includes a tab 124 that interacts with the plunger 110 and a hook end 128 opposite the tab 124. The hook end 128 releasably engages a front leg cross-brace 130 that extends between the front legs 20 (see FIG. 11). When the release handle 72 is pulled upwardly when the chassis 14 and shell 16 are in the transport condition shown in FIG. 3A, the cable 74 and the cable 104 rotate the hook 90 and the hook 120 respectively. When the hook 90 rotates, the hook 90 disengages from the rod 58 coupled to the rear legs 22. Similarly, when the hook 120 rotates, the hook 120 disengages from the front leg cross brace 130. With the front legs 20 and the rear legs 22 disengaged, the combined unit of the chassis 14 and the shell 16 is allowed to move to the stroller transport condition shown in FIG. 4. In some aspects, the front legs 20 and the rear legs 22 may be spring-biased to the stroller transport condition, such that when the release handle 72 is pulled, the front legs 20 and the rear legs 22 are moved via gravity and the spring-assist to the deployed, stroller condition of FIG. 4.

In some aspects, the second release mechanism 70 is operable in a third function to allow the shell 16, when separated from the chassis 14 and the base 12, to be releasably coupled to a standard tower stroller system, such as those already known in the art. To facilitate this connection, as best seen in FIGS. 6 and 25, the shell 16 includes a release latch 136 pivotally coupled to the shell 16 within a recessed area 138. The recessed area 138 is located proximate a hub 140 of a handle assembly 142 on the shell 16. The latch 136 is pivotally biased to a closed orientation, allowing the shell 16 to drop into a standard tower stroller system, with the latch 136 engaging a portion of the standard tower stroller system (such as a cylindrical attachment portion). As seen in FIG. 25, the latch 136 is coupled, via a cable 144 to the release handle 72. As the release handle 72 is pulled, the latch 136 rotates to release the latch from engagement with the standard tower stroller system. In some aspects, the cable 144 may be integrally formed with cable 74 and/or cable 104, while in other aspects, the cable 144 is a separate component.

Figures 3A, 3B:
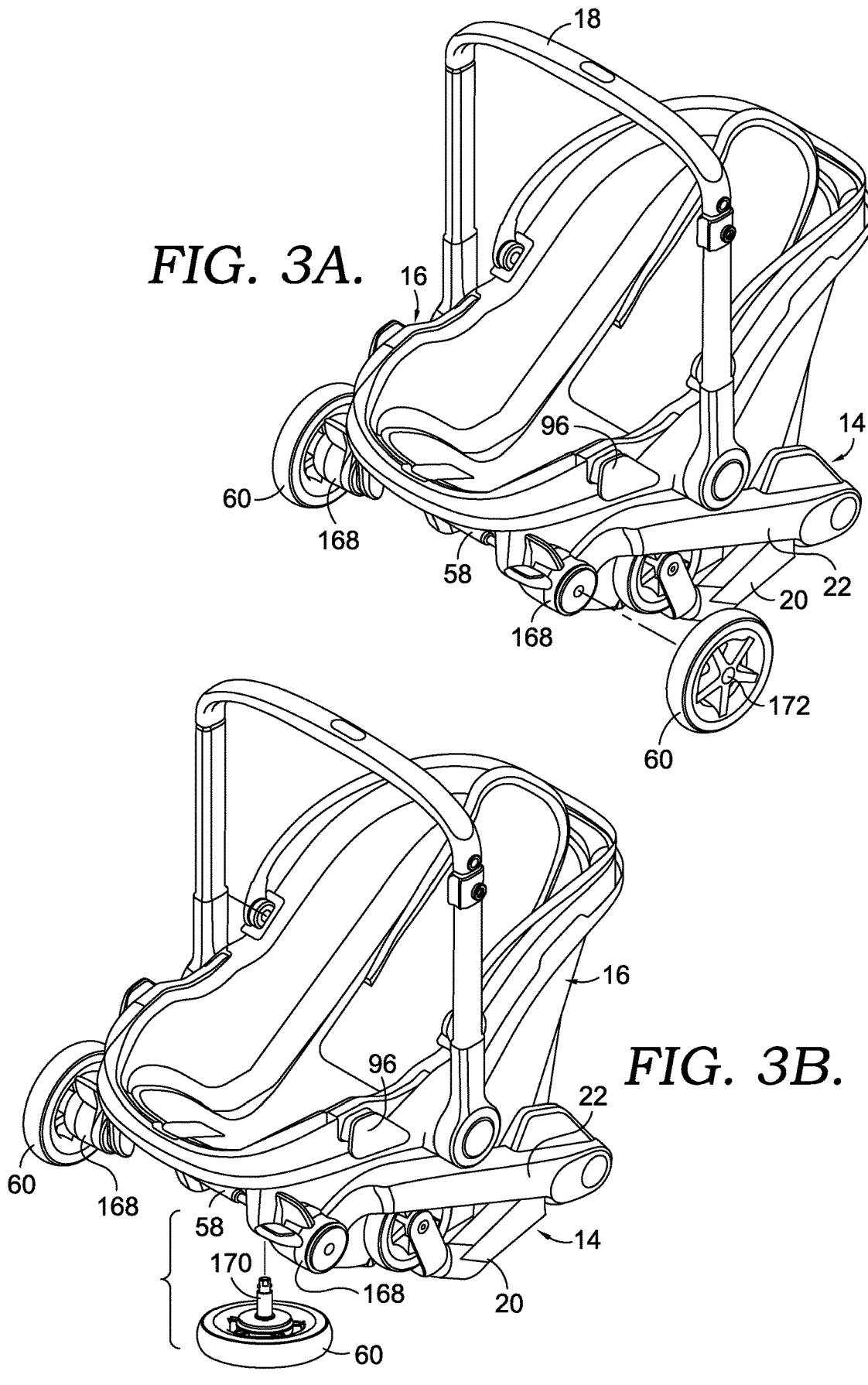
FIG. 3A is a perspective view of the chassis and the shell of the infant transport system, decoupled from the base and showing a first stage of repositioning a rear wheel.
FIG. 3B is a perspective view of the chassis and the shell of the infant transport system, decoupled from the base and showing a second stage of repositioning a rear wheel.
Figure 4:
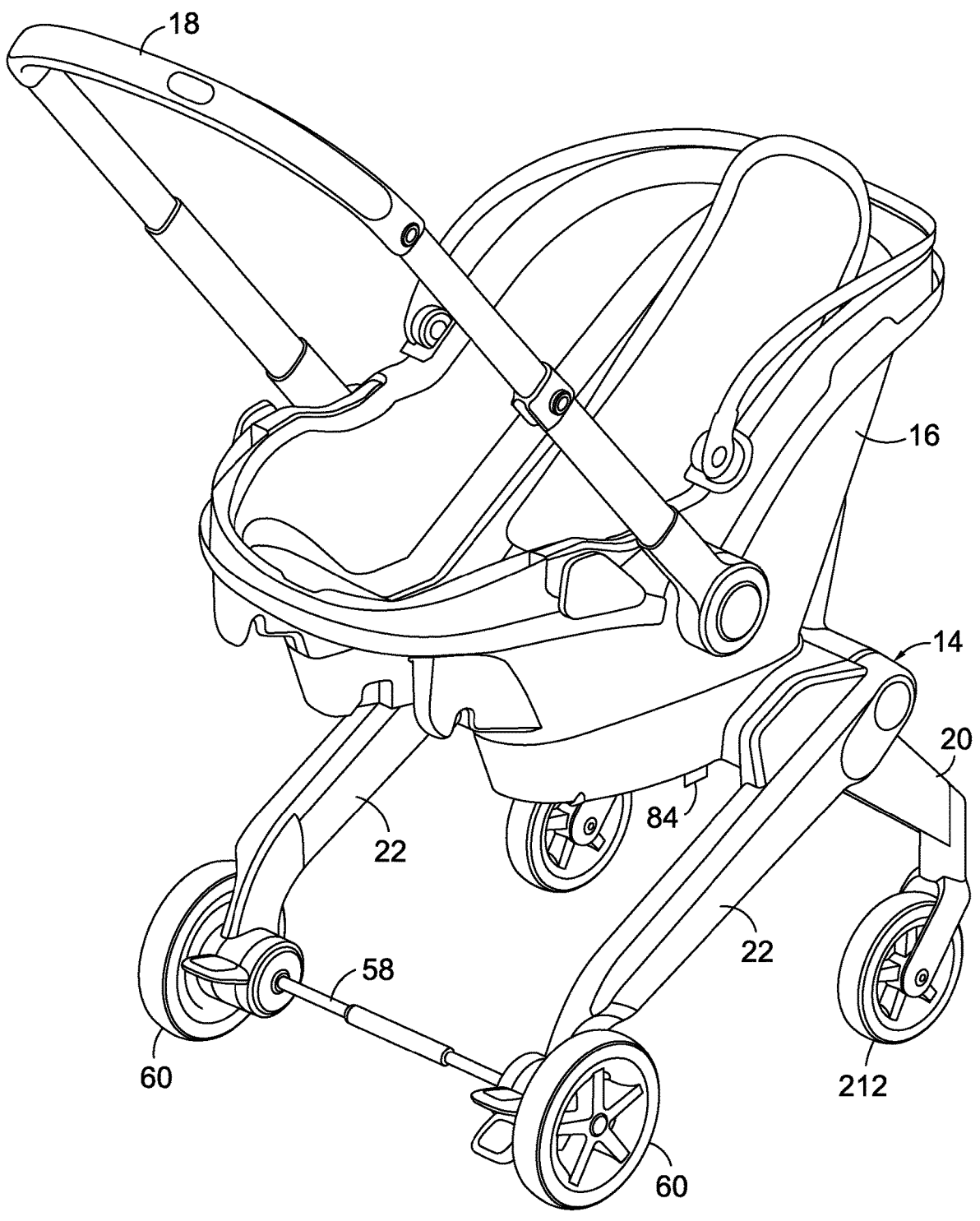
FIG. 4 is a perspective view of the chassis and the shell of the infant transport system decoupled from the base and with the legs deployed in a second transport condition.
Figure 13A:
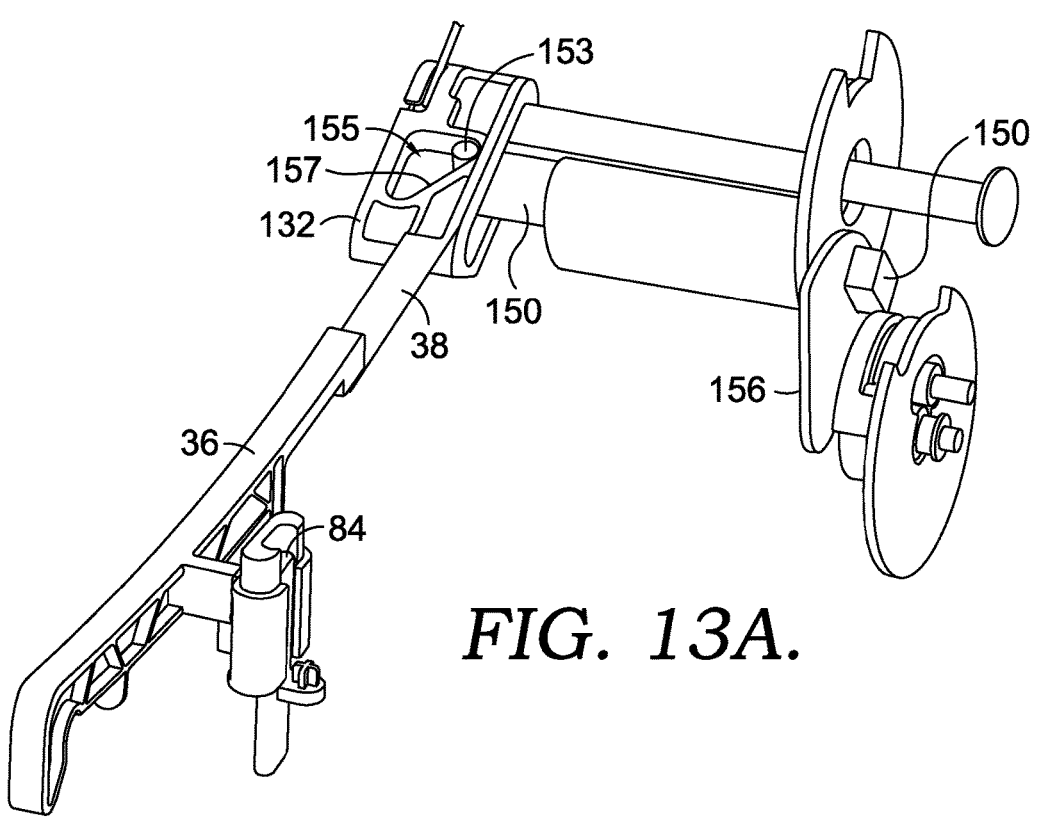
FIG. 13A is a partial perspective view of certain components of a first release mechanism in a first state.
Figure 13B:
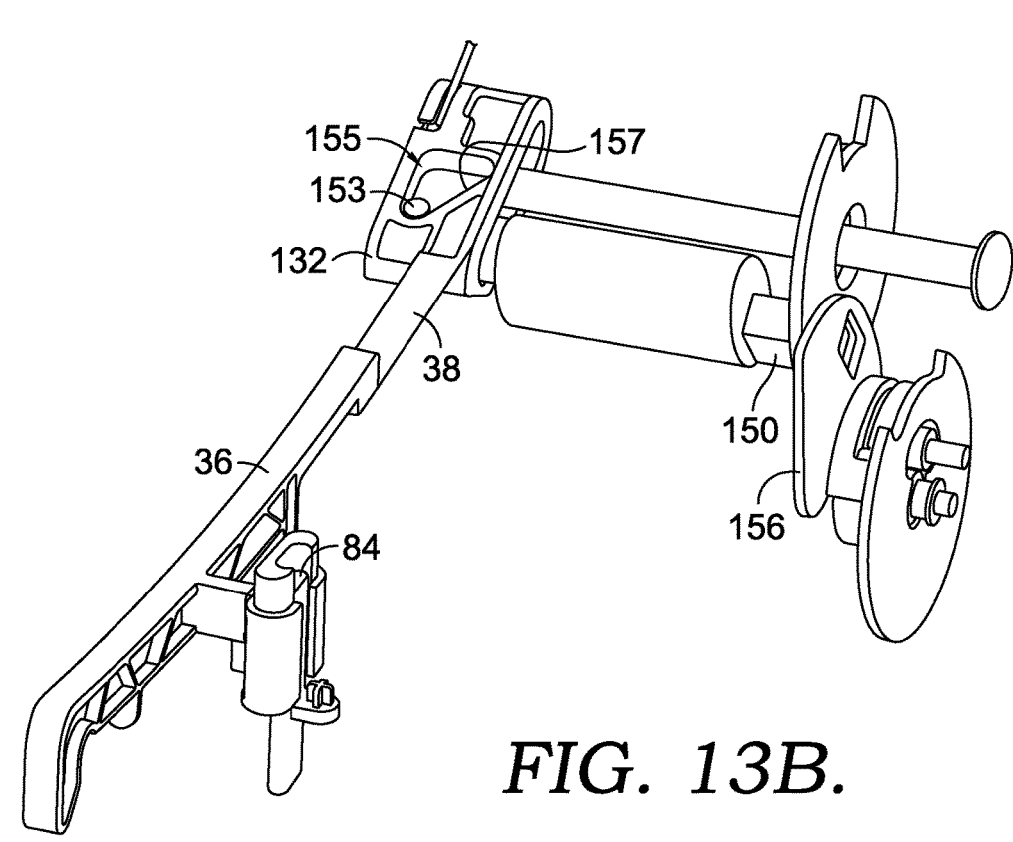
FIG. 13B is a view similar to FIG. 13A with the first release mechanism in a second state.

The first release mechanism 24 is operable in a second function to allow the deployed front legs 20 and the rear legs 22 (as shown in FIG. 4) to be retracted and returned to the transport condition shown in FIG. 3A. To achieve this function, the chassis 14 includes a locking peg 150, as best seen in FIGS. 13A and 13B. The locking peg 150 is spring loaded to extend outwardly (as viewed in FIG. 13A, the spring biases peg 150 to the right). The chassis 14 includes a channel that extends through a hub 154 of the rear leg 22 and into a hub 156 of the front leg 20. When the rear leg 22 rotates downwardly to the deployed transport condition shown in FIG. 4, the locking peg 150 moves, via the spring force, through the channel extending through and into the hub 156 of the front leg 20 (as shown in FIG. 13A), locking the front legs 20 in the deployed condition. The locking peg 150 includes an upwardly extending cam pin 153 that extends through a triangular opening 155 in carriage 132. The triangular opening 155 includes an angled cam surface 157. As the handle 72 is pulled upwardly, the carriage 132 moves rearwardly. This rearward movement causes the cam surface 157 to act on the pin 153, moving the locking peg 150 inwardly and out of engagement with the hub 156 of the front leg 20 (as shown in FIG. 13B), allowing the front leg 20 to rotate.

Figure 14:
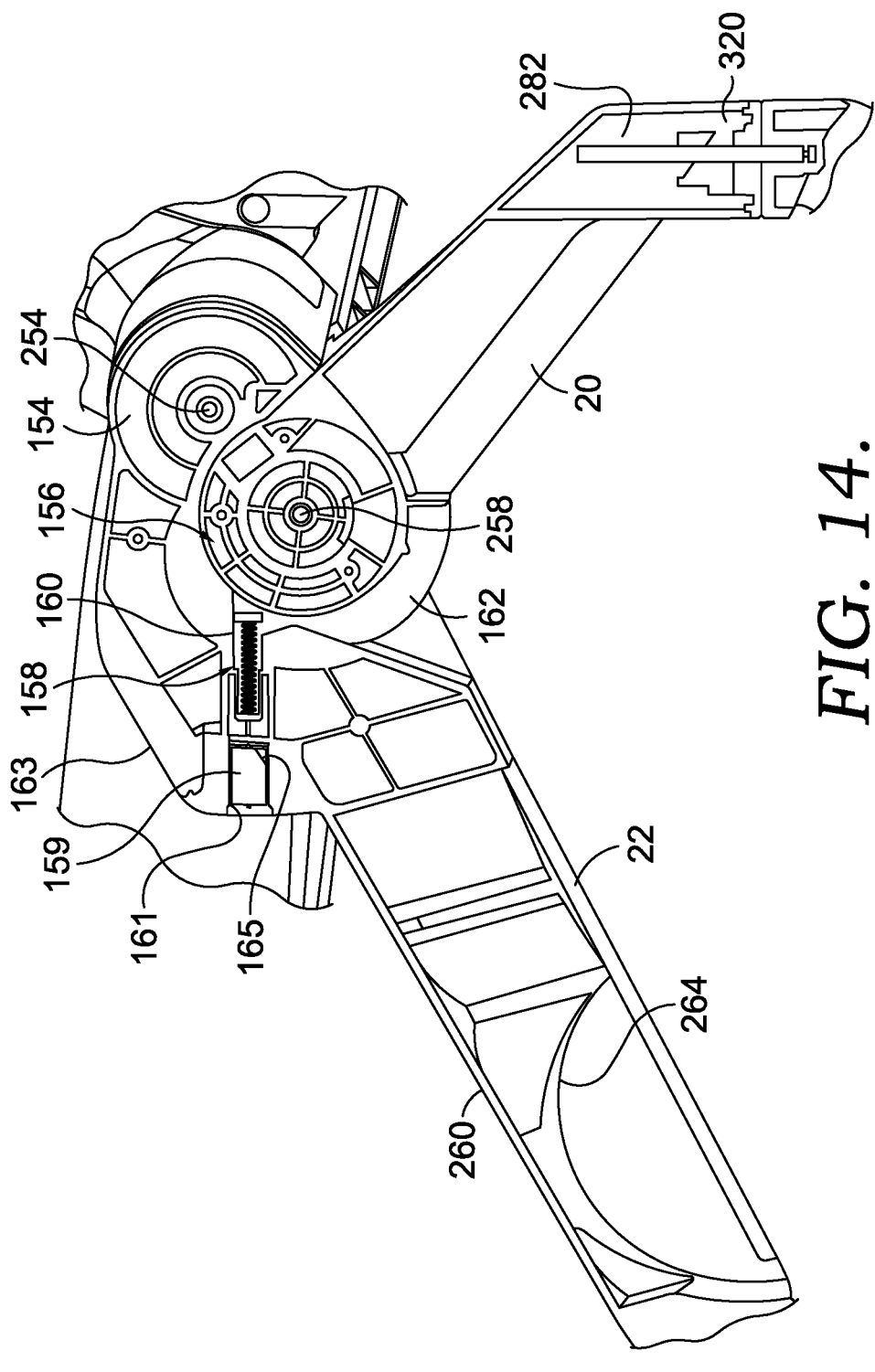
FIG. 14 is a partial cross-section of the legs of the chassis of FIG. 12.
Figure 18:
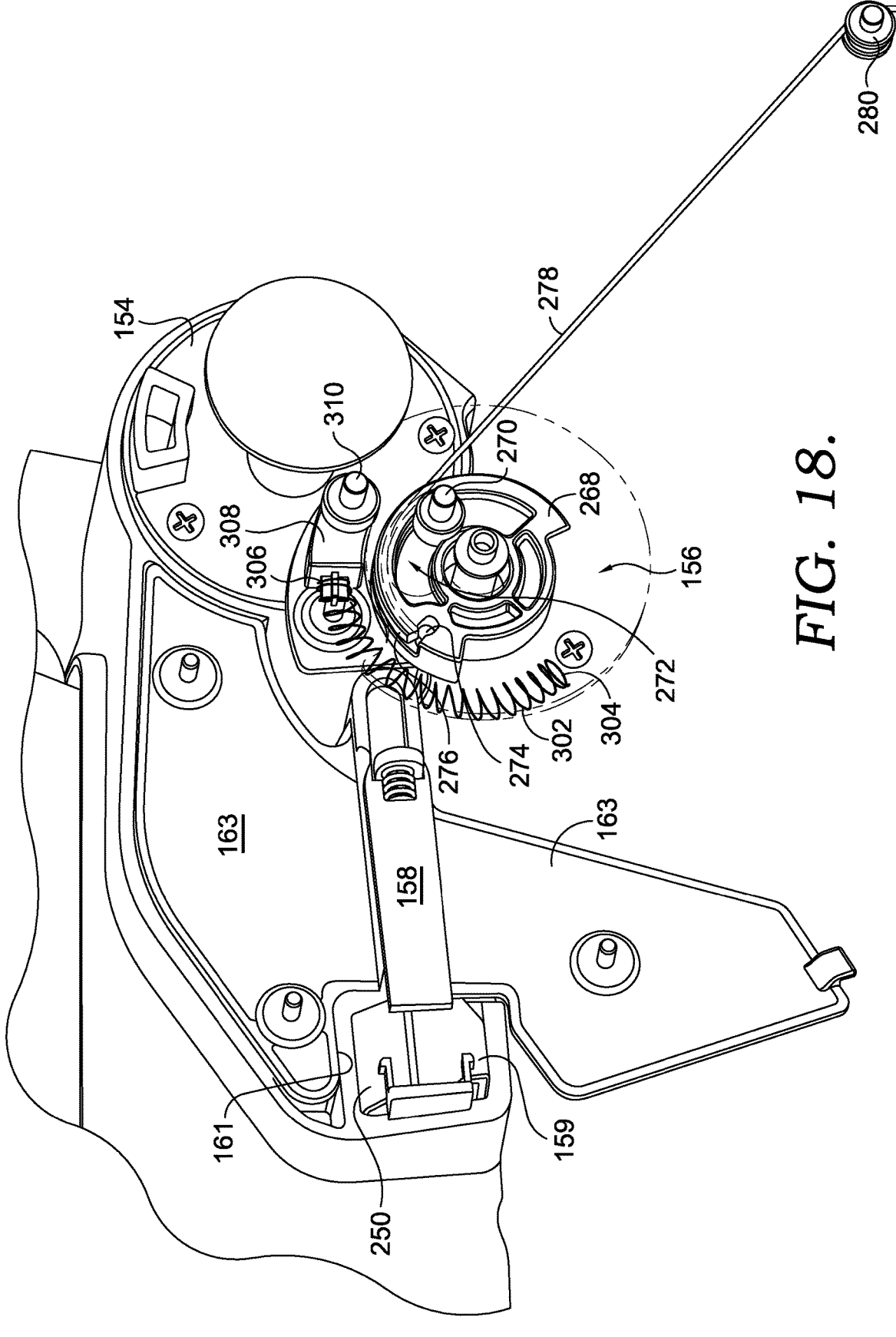
FIG. 18 is an enlarged, partial view of certain components associated with the front legs and the rear legs, in accordance with aspects herein.
Figure 19:
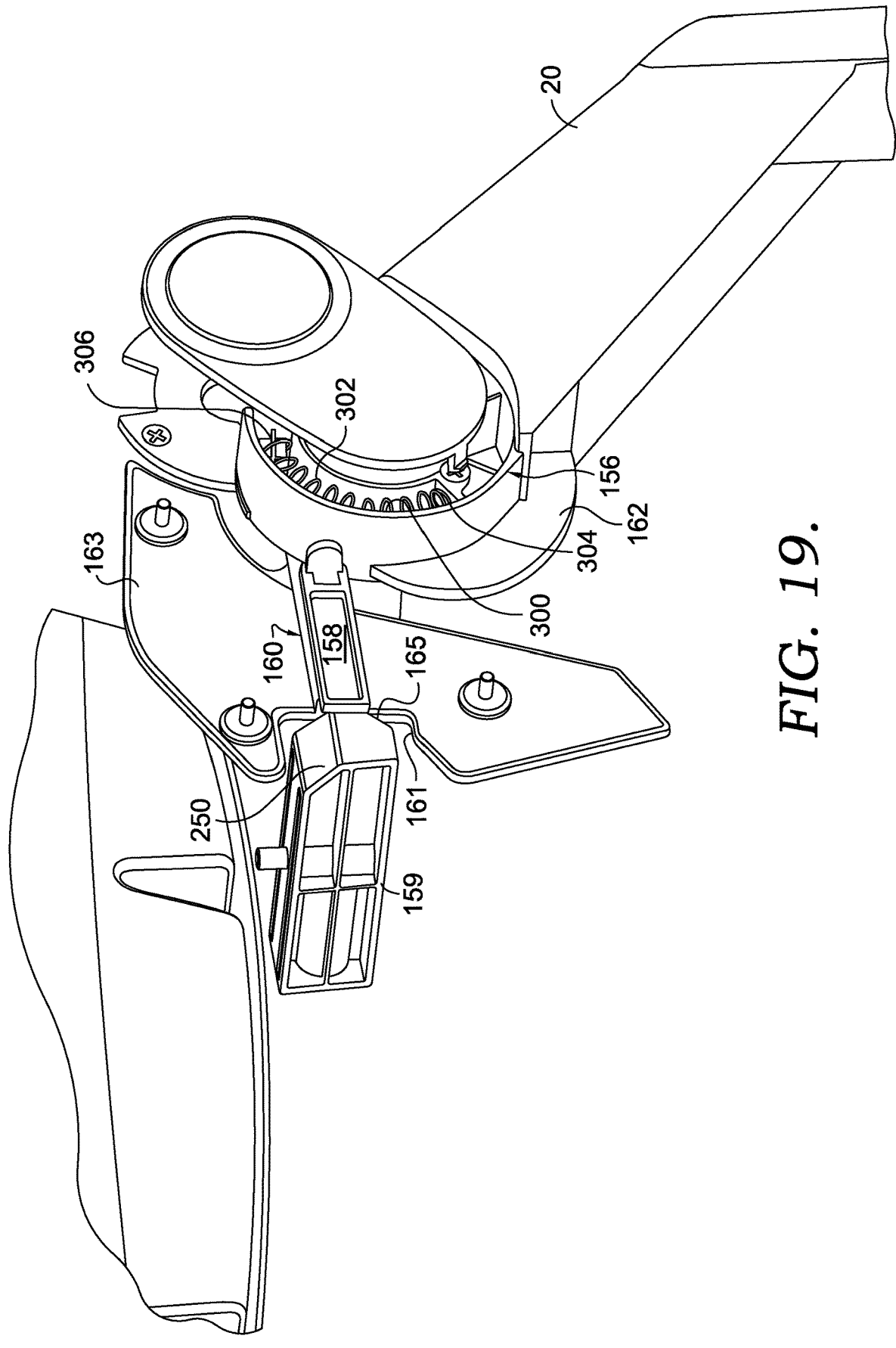
FIG. 19 is a view similar to FIG. 18 but showing a different perspective, with different parts shown and hidden.
Figure 20:
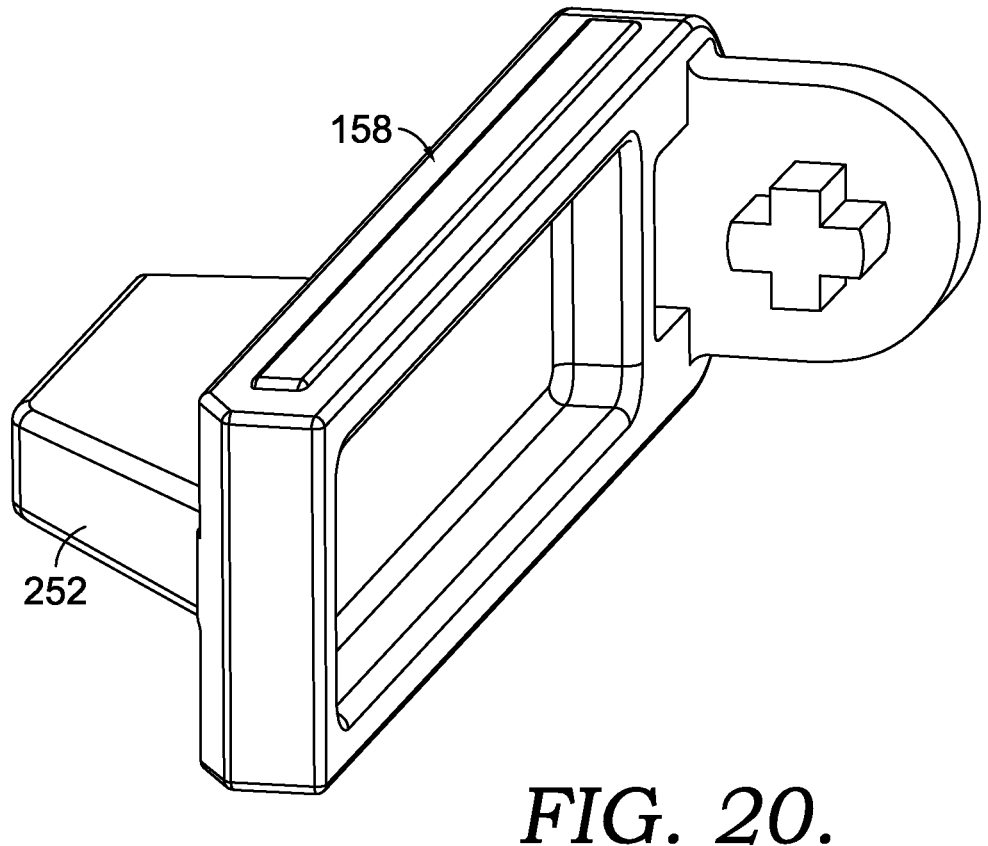
FIG. 20 is an enlarged view of a release cam associated with the rear legs.
Figure 22:
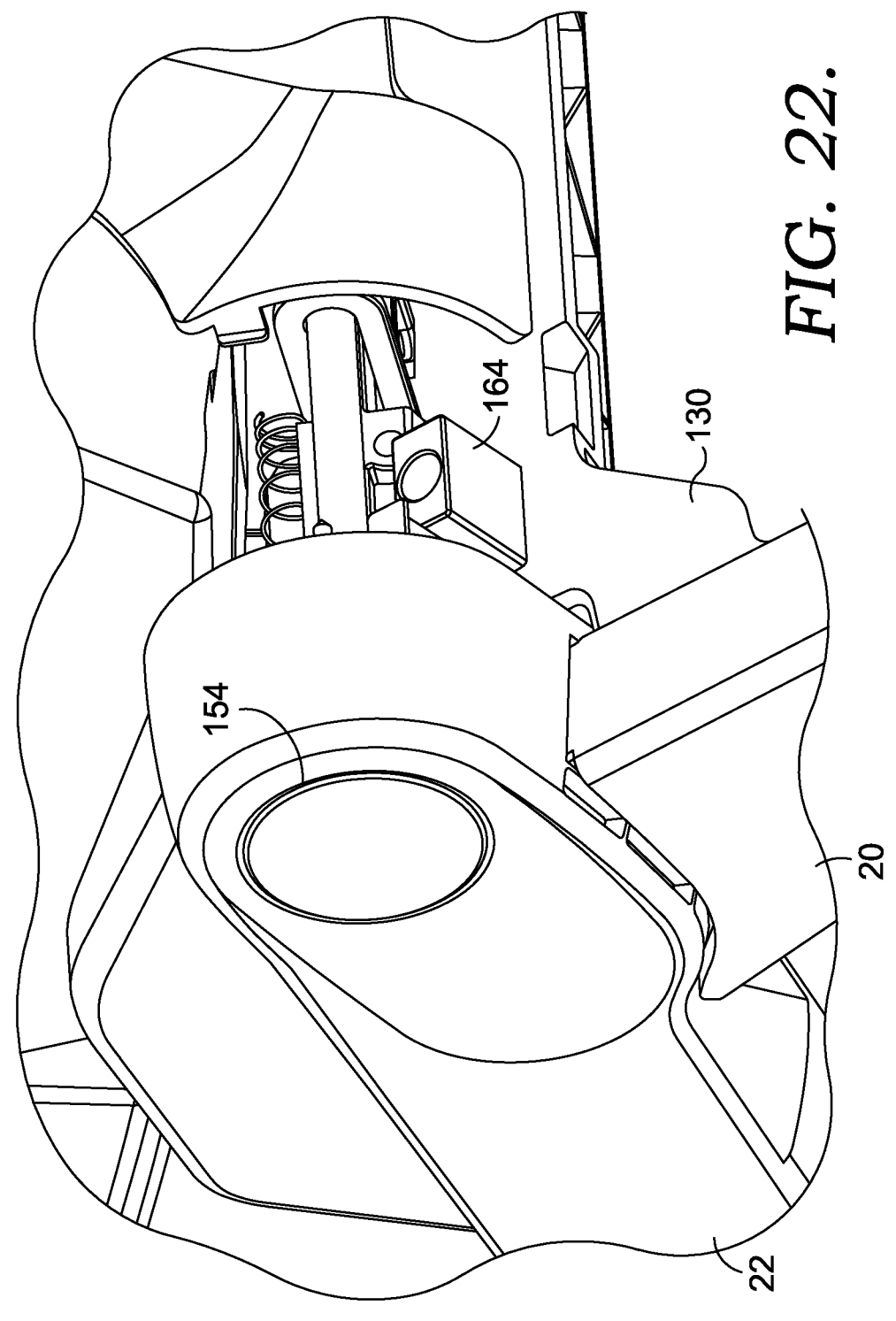
FIG. 22 is a partial perspective view of the chassis with parts being broken away.
Figure 23:
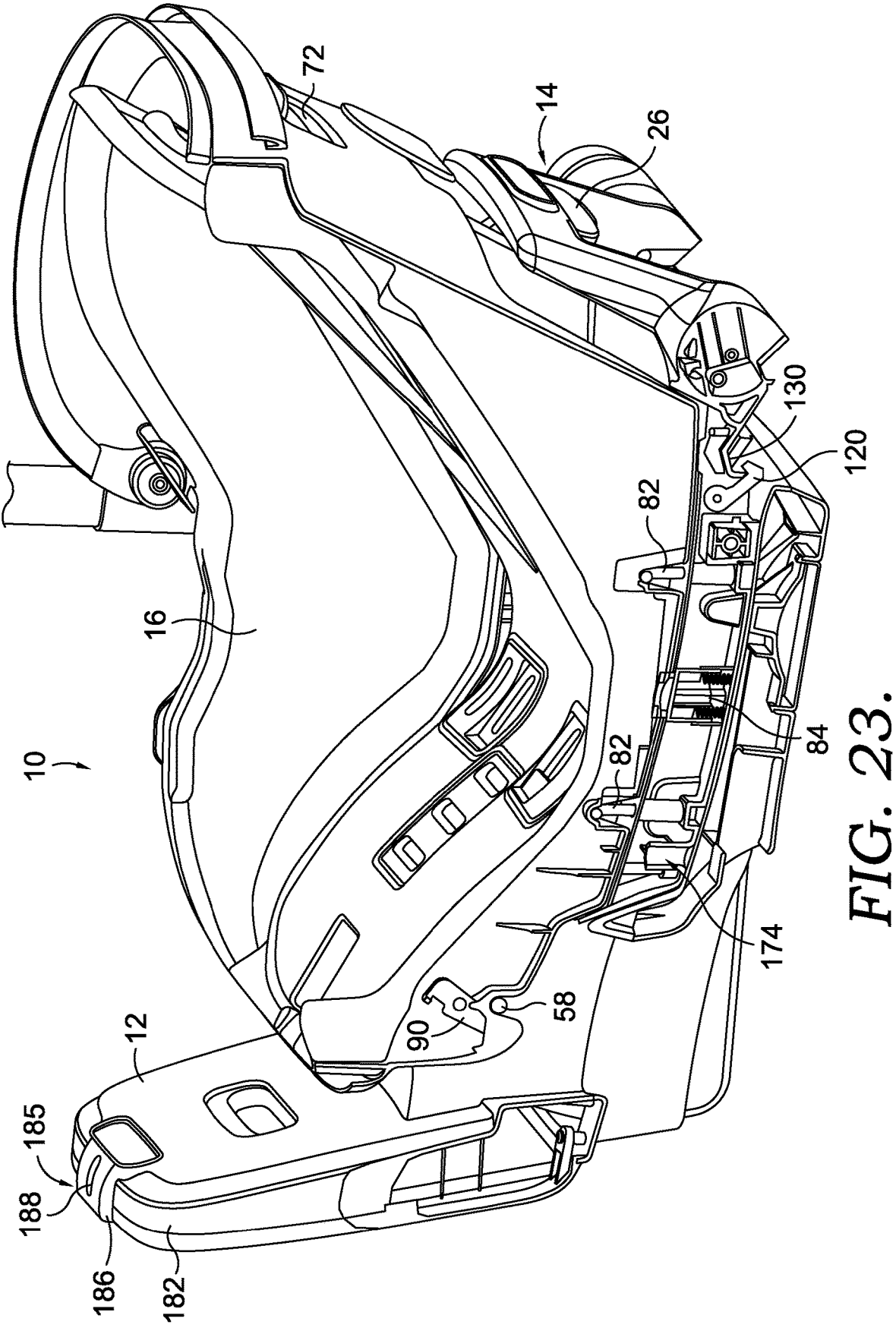
FIG. 23 is a cross-section of the infant transport system of FIG. 1.

As best seen in FIGS. 14, 18 and 19, the rear legs 22 are also locked in the deployed condition via a first lock 159 in the chassis 14. The lock 159 is spring loaded to extend into a locking notch 161 in a hub extension 163 in the rear leg 22, when the rear leg 22 is in the deployed position. In some aspects, the lock 159 includes an angled cam surface 250 that interacts with the hub extension 163 as the rear leg 22 is being deployed, moving the lock 159 inwardly and allowing the rear leg 22 to rotate. Once in the fully-deployed position, the lock 159 moves into the locking notch 161 as shown in FIG. 19. The front leg 20 has a cam lobe 162 extending radially outwardly from the front leg hub 156. The cam lobe 162 is shaped to engage a release cam 158 that is slidingly disposed in a channel 160, as the front leg 20 rotates from the deployed position to the retracted position. As the cam lobe 162 engages the release cam 158, the release cam 158 is moved into engagement with the lock 159 to move the lock 159 out of the locking notch 161 in the rear leg 22, allowing the rear leg 22 to rotate. In some aspects, as best seen in FIG. 20, the release cam 158 has an angled cam surface 252 that interacts with the lock 159 to initiate the inward movement of the lock 159 as it interacts with the release cam 158. Further, in some aspects, the lock 159 may include a chamfer 165 that ensures the lock 159 will not interfere with the retracting motion of the front legs 20. If the rear legs 22 have cleared the lock 159, and the front legs 20 are not yet positioned to block the lock 159 from outward movement, the front legs 20 will contact the chamfer 165 and the front legs 20 can move the lock 159 inwardly to allow full retraction of the front legs 20. In this way, the first release mechanism 24 is operable in a second function to allow the front legs 20 and the rear legs 22 to retract. In some aspects, as best seen in FIG. 22, the chassis 14 includes a spring module 164 that acts on the front leg 20. As the locking peg 150 moves out of engagement with the hub 156, the spring module 164 acts to impart a rotational force on the front leg 20 (through the front cross brace 130), assisting the front leg 20 in moving to a retracted position. In some aspects, the spring module 164 acts to only partially retract the front legs 20.

Figures 15, 15A:
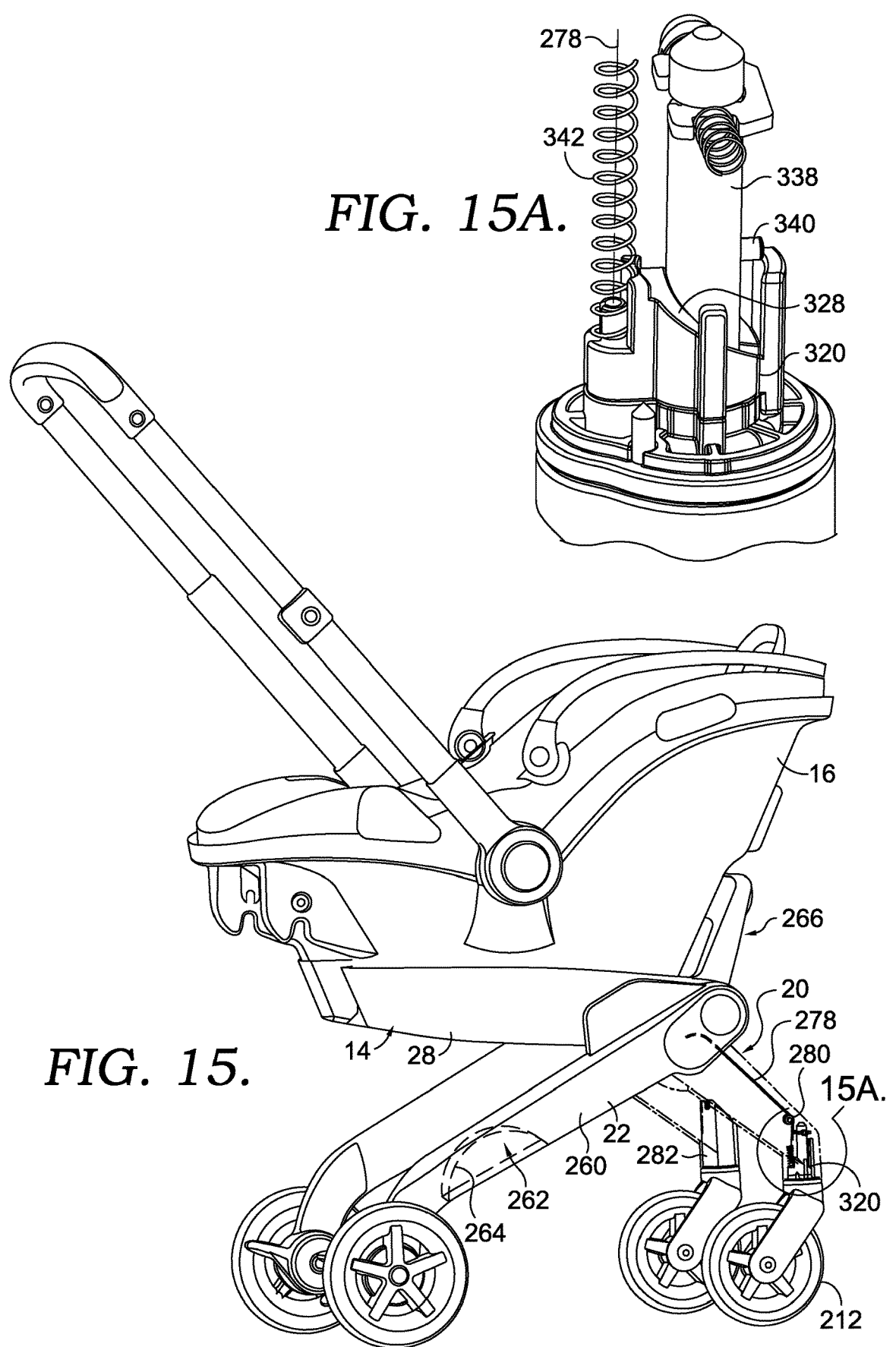
FIG. 15 is a perspective view, similar to FIG. 4, but with some parts shown hidden to reveal details of construction.
FIG. 15A is an enlarged view of the encircled region 15A in FIG. 15.
Figure 21:
FIG. 21 is a partial side elevation view, similar to FIG. 7, shown with certain parts hidden.

As best seen in FIGS. 14 and 15, the rear legs 20 pivot about a rear leg pivot axis 254, and as described above, the rear legs 20 are pivotally coupled to the chassis 14. In some aspects, as seen in FIG. 21, an axle may be used and serves as the rear leg pivot axis 254 to pivotally couple the rear leg 20 to the chassis 14. Each front leg 22 is pivotally coupled to a respective rear leg 20 at a front leg pivot axis 258. Each rear leg 20 has an outer shell 260 with spaced apart sides forming an internal cavity 262. As seen in FIGS. 14, 15 and 21, the internal cavity may include a curved-shape section 264 that is sized to accommodate at least a portion of a front wheel 212, when the front legs 20 are in the retracted position (such as depicted in the partial view shown in FIG. 21). In some aspects, the rear leg pivot axis 254 is offset from the front leg pivot axis 258. In the deployed position of FIGS. 14 and 15, the front leg pivot axis 258 is located below and rearward of the rear leg pivot axis 254 (from the perspective of a front 266 of chassis frame 28). The offset front leg pivot axis 258 and rear leg pivot axis 254 provide a unique motion for the deployment and retraction of the front legs 20 and the rear legs 22.

As best seen in FIGS. 18 and 19, the front leg hub 156 may include an interior curved channel 300 that houses a spring 302. A first end 304 of the spring 302 acts against one end of the channel 300. A second end 306 of the spring 302 is coupled to, and acts against, a block 308. The block 308 includes a pin 310 that couples it to the rear leg hub 154. As the front legs 20 and the rear legs 22 are released from the retracted position, and once the rear legs 22 are locked in the deployed position, the spring 302 imparts a force biasing the front legs 20 away from the rear legs 22, assisting in the further deployment of the front legs 20.

The front leg 20 may include an assembly to orient the front wheel 212 with respect to the rear leg 22 to allow the front wheel 212 to nest at least partially within the rear leg 22 in the retracted position. As best seen in FIG. 18, the front leg 20 may include a guide hub 268 that is coupled to the hub 156 with a pin 270. In some aspects, the guide hub 156 may include a curved slot 272 that allows the hub 156 to rotate slightly before the guide hub 268 rotates along with the hub 156. In some aspects, the guide hub 268 includes an anchor slot 274 and a guide slot 276 extending away from the anchor slot 274 and around the outer diameter of the guide hub 268. A wire 278 has one terminal end coupled within the anchor slot 274. As the wire 278 extends from the terminal end, it rests within the guide slot 276. The wire 278 extends internally within the front leg 20 and over a pulley 280 held within a cover 282 (see FIG. 15). The wire 278 is guided around the pulley 280, through the cover 282 and terminates at a cam sleeve 320. The cam sleeve 320 is best seen in FIGS. 16 and 17. The cam sleeve 320 includes a wire guide 322 that is coupled to an anchor slot 324. The anchor slot 324 retains the other terminal end of the wire 278. The cam sleeve 320 includes guide fingers 326 that position the cam sleeve 320 within the cover 282, aligning the cam sleeve 320 and the cover 282, while allowing the cam sleeve 320 to translate up and down within the cover 282. As best seen in FIG. 16, the cam sleeve 320 also includes a radial, sloping cam surface 328 with an upper extent 330 sloping down to a lower extent 332. At the lower extent 332, the cam sleeve 320 includes an alignment channel 334. The cam sleeve 320 also includes a central bore 336 that is sized to accommodate a post 338 extending upwardly from the front wheel 212 (see FIG. 15A). In some aspects, a pin 340 is coupled to the post 338 and extends radially outward from the post 338. When the front legs 20 are in the deployed position of FIG. 15, a spring 342 disposed within the cover 282 biases the cam sleeve 320 to a lower position. In this lowered position (of FIG. 15, for example), the pin 340 is located above the cam sleeve 320, and the front wheel 212 is able to rotate 360 degrees so the front wheels 212 function as unlocked casters. As the front legs 20 retract from the deployed position (e.g. FIG. 15) to the retracted position (e.g. FIG. 21), the rotation of the front legs 20 and the wire 278 act on the cam sleeve 320, pulling it upwardly. As the cam sleeve 320 is pulled upwardly, the pin 340 on the post 338 acts on the cam surface 328. The cam surface 328 guides the pin 340 into the alignment channel 334. With the pin 340 within the alignment channel 334, the front wheels 212 are no longer able to rotate, and are positioned in the orientation shown in FIG. 21. This ensures that the front wheel 212 will be oriented properly to nest within the cavity 264 in the rear legs 22. With this construction, the front wheels 212 can be offset casters in the deployed position and able to rotate freely, but are guided to, and held within, a proper orientation for nesting in the retracted position. Without the structure described above, the weight of the wheels 212 on the offset caster would, through gravity, fall to a position 180 degrees from that shown in FIG. 21, and so would not properly nest within the rear legs 22.

As described above, with the front legs 20 and the rear legs 22 retracted, the combined unit of the chassis 14 and the shell 16 may be used to transport an infant in a vehicle, without using the base 12. In some aspects, to better orient and stabilize the combined unit of the chassis 14 and the shell 16 within the vehicle, it may be desirable to relocate the rear wheels 60. As best seen in FIGS. 3A and 3B, each rear wheel 60 may be releasably coupled a lower hub 168. In some aspects, the rear wheel 60 has an axle 170 that serves as a quick-release pin. The pin has a retractable ball, activated by a push-button 172 at the outer end of the axle 170. When the button 172 is pressed, the ball retracts within the pin, allowing the axle 170 (and thus the rear wheel 60) to be removed from the hub 168 as shown in FIG. 3A. Other forms of quick-release may also be used in coupling the rear wheel 60 within the hub 168. As best seen in FIG. 3B, the removed rear wheel 60 and axle 170 may then be inserted into a vertical receiving cavity on the chassis 14. The same can be done for the other rear wheel 60, such that both rear wheels 60 are received in a respective receiving cavity (one on each side of the chassis 14). With the wheels 60 in the receiving cavities, the rear wheels 60 prevent the combined unit of the chassis 14 and the shell 16 from rocking or tipping when installed within a vehicle.

The following clauses provide example configurations of an infant transport system and assembly as disclosed herein.

Clause 1. An infant transport system, comprising: a base; a chassis releasably coupled to the base, comprising: a frame; a pair of rear legs pivotally coupled to the frame at a rear leg pivoting axis; and a pair of front legs, each front leg pivotally coupled to a respective rear leg at a front leg pivoting axis, wherein the rear legs and the front legs are retracted and proximate the frame in a first transport condition, and wherein the rear legs and the front legs are deployable away from the frame to a second transport condition; and an infant car seat releasably coupled to the combination of the chassis and the base, the infant car seat having a first handle operable in a first function to release the infant car seat from the combination of the chassis and the base.

Clause 2. The system of clause 1, wherein the chassis includes at least one post, and wherein the infant car seat includes at least one hook selectively engageable with the at least one post, the at least one hook moveable upon operation of the first handle when the infant car seat and chassis are coupled to the base, the first handle operable to disengage the at least one hook from the at least one post in the first function to release the infant car seat from the chassis and the base.

Clause 3. The system of any of clauses 1-2, wherein the chassis and infant car seat are removable as a combined unit from the base, and wherein the first handle is operable in a second function to release the legs from the retracted first transport condition to the deployed second transport condition.

Clause 4. The system of any of clauses 1-3, wherein the chassis comprises a second handle operably coupled to a release mechanism and wherein the second handle is operable in a first function to activate the release mechanism to decouple the infant car seat and the chassis as a combined unit from the base.

Clause 5. The system of any of clauses 1-4, wherein the second handle is operable in a second function to release the deployed front legs and rear legs to allow the legs to move from the deployed second transport condition to the retracted first transport condition.

Clause 6. The system of any of clauses 1-5, wherein the chassis includes a spring-loaded pin that selectively couples the first handle with the at least one hook, such that the at least one hook is operable via the first handle only when the chassis is coupled to the base.

Clause 7. The system of any of clauses 1-6, wherein each rear leg further comprises a hub extension including a locking notch, and wherein the chassis further comprises a first lock, the first lock aligning with and extending into the locking notch in the second transport condition to lock the rear legs in the second transport condition.

Clause 8. The system of any of clauses 1-7, wherein the first lock is spring-biased to extend into the locking notch when the first lock is aligned with the locking notch.

Clause 9. An infant transport system, comprising: a base configured to be coupled within an automobile; a chassis releasably coupled to the base, comprising: a frame; a pair of rear legs pivotally coupled to the frame; and a pair of front legs, each front leg pivotally coupled to a respective rear leg, wherein the rear legs and the front legs are retracted and proximate the frame in a first transport condition, and wherein the rear legs and the front legs are deployable away from the frame to a second transport condition; and an infant car seat releasably coupled to the combination of the chassis and the base, the infant car seat having a first handle coupled to a first release mechanism, the first handle operable to engage a first function of the first release mechanism to release the infant car seat from the combination of the chassis and the base.

Clause 10. The system of clause 9, wherein the chassis includes at least one post, and wherein the infant car seat includes at least one hook selectively engageable with the at least one post, the at least one hook moveable upon operation of the first handle when the infant car seat and chassis are coupled to the base, the first handle operable to disengage the at least one hook from the at least one post in the first function to release the infant car seat from the chassis and the base.

Clause 11. The system of any of clauses 9-10, wherein the chassis and infant car seat are removable as a combined unit from the base, and wherein the first handle is operable in a second function to release the legs from the retracted first transport condition to the deployed second transport condition.

Clause 12. The system of any of clauses 9-11, wherein the chassis comprises a second handle operably coupled to a release mechanism and wherein the second handle is operable in a first function to activate the release mechanism to decouple the infant car seat and the chassis as a combined unit from the base.

Clause 13. The system of any of clauses 9-12, wherein the second handle is operable in a second function to release the deployed front legs and rear legs to allow the legs to move from the deployed second transport condition to the retracted first transport condition.

Clause 14. The system of any of clauses 9-13, wherein the chassis includes a spring-loaded pin that selectively couples the first handle with the at least one hook, such that the at least one hook is operable via the first handle only when the chassis is coupled to the base.

Clause 15. The system of any of clauses 9-14, wherein each rear leg further comprises a hub extension including a locking notch, and wherein the chassis further comprises a first lock, the first lock aligning with and extending into the locking notch in the second transport condition to lock the rear legs in the second transport condition.

Clause 16. The system of any of clauses 9-15, wherein the first lock is spring-biased to extend into the locking notch when the first lock is aligned with the locking notch.

Clause 17. A convertible infant car seat and stroller assembly, comprising: a chassis comprising: a frame having a front end and a rear end; a pair of rear legs pivotally coupled to the frame, each rear leg having an outer shell having spaced apart sides forming an internal cavity and a rear wheel rotatably coupled to the outer shell; and a pair of front legs, each front leg pivotally coupled to a respective rear leg, and a front wheel coupled to each front leg, and wherein the rear legs and the front legs are retracted and proximate the frame in a first transport condition usable within an automobile as a car seat, and wherein the rear legs and the front legs are deployable away from the frame to a second transport condition usable as a stroller; and an infant car seat coupled to the chassis.

Clause 18. The assembly of clause 17, wherein the front wheels are at least partially nested within the internal cavity of the outer shell of the rear legs when in the first transport condition.

Clause 19. The assembly of any of clauses 17-18, wherein each rear leg further comprises a hub extension including a locking notch, and wherein the chassis further comprises a first lock, the first lock aligning with and extending into the locking notch in the second transport condition to lock the rear legs in the second transport condition.

Clause 20. The assembly of any of clauses 17-19, wherein each front leg further comprises a cam lobe projecting from the hub of the front leg, the system further comprising a release cam slidingly coupled to the hub of the rear leg, and wherein the cam lobe interacts with the release cam as the front legs move from the second transport condition to the first transport condition to move the release cam into engagement with the first lock and moving the first lock out of engagement with the locking notch.

To assist and clarify the description of various embodiments, various terms are defined herein. Unless otherwise indicated, the following definitions apply throughout this specification (including the claims). Additionally, all references referred to are incorporated herein in their entirety.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. An infant transport system, comprising:
a base;
a chassis releasably coupled to the base, comprising:
a frame;
a pair of rear legs pivotally coupled to the frame at a rear leg pivoting axis; and
a pair of front legs, each front leg pivotally coupled to a respective rear leg of the pair of rear legs at a front leg pivoting axis, wherein the rear legs and the front legs are retracted to the frame in a first transport condition, and wherein the rear legs and the front legs are deployable away from the frame to a second transport condition; and
an infant car seat releasably coupled to a combination of the chassis and the base, the infant car seat having a first handle operable in a first function to release the infant car seat from the combination of the chassis and the base;
wherein the chassis includes at least one post, and wherein the infant car seat includes at least one hook selectively engageable with the at least one post, the at least one hook moveable upon operation of the first handle when the infant car seat and chassis are coupled to the base, the first handle operable to disengage the at least one hook from the at least one post in the first function to release the infant car seat from the chassis and the base.

2. The system of claim 1, wherein the chassis and infant car seat are removable as a combined unit from the base, and wherein the first handle is operable in a second function to release the legs from the retracted first transport condition to the deployed second transport condition.

3. The system of claim 2, wherein the chassis comprises a second handle operably coupled to a release mechanism and wherein the second handle is operable in a first function to activate the release mechanism to decouple the infant car seat and the chassis as the combined unit from the base.

4. The system of claim 3, wherein the second handle is operable in a second function to release the deployed front legs and rear legs to allow the legs to move from the deployed second transport condition to the retracted first transport condition.

5. The system of claim 4, wherein the chassis includes a spring-loaded pin that selectively couples the first handle with the at least one hook, such that the at least one hook is operable via the first handle only when the chassis is coupled to the base.

6. The system of claim 5, wherein each rear leg further comprises a hub having a hub extension including a locking notch, and wherein the chassis further comprises a first lock, the first lock aligning with and extending into the locking notch in the second transport condition to lock the rear legs in the second transport condition.

7. The system of claim 6, wherein the first lock is spring-biased to extend into the locking notch when the first lock is aligned with the locking notch.

8. An infant transport system, comprising:
a base;
a chassis releasably coupled to the base, comprising:
a frame;
a pair of rear legs pivotally coupled to the frame; and
a pair of front legs, each front leg pivotally coupled to a respective rear leg of the pair of rear legs, wherein the rear legs and the front legs are retracted to the frame in a first transport condition, and wherein the rear legs and the front legs are deployable away from the frame to a second transport condition; and an infant car seat releasably coupled to a combination of the chassis and the base, the infant car seat having a first handle coupled to a first release mechanism, the first handle operable to engage a first function of the first release mechanism to release the infant car seat from the combination of the chassis and the base;

wherein the chassis includes at least one post, and wherein the infant car seat includes at least one hook selectively engageable with the at least one post, the at least one hook moveable upon operation of the first handle when the infant car seat and chassis are coupled to the base, the first handle operable to disengage the at least one hook from the at least one post in the first function to release the infant car seat from the chassis and the base.

9. The system of claim 8, wherein the chassis and infant car seat are removable as a combined unit from the base, and wherein the first handle is operable in a second function to release the legs from the retracted first transport condition to the deployed second transport condition.

10. The system of claim 9, wherein the chassis comprises a second handle operably coupled to a release mechanism and wherein the second handle is operable in a first function to activate the release mechanism to decouple the infant car seat and the chassis as a combined unit from the base.

11. The system of claim 10, wherein the second handle is operable in a second function to release the deployed front legs and rear legs to allow the legs to move from the deployed second transport condition to the retracted first transport condition.

12. The system of claim 11, wherein the chassis includes a spring-loaded pin that selectively couples the first handle with the at least one hook, such that the at least one hook is operable via the first handle only when the chassis is coupled to the base.

13. The system of claim 12, wherein each rear leg further comprises a hub having a hub extension including a locking notch, and wherein the chassis further comprises a first lock, the first lock aligning with and extending into the locking notch in the second transport condition to lock the rear legs in the second transport condition.

14. The system of claim 13, wherein the first lock is spring-biased to extend into the locking notch when the first lock is aligned with the locking notch.

15. A convertible infant car seat and stroller assembly, comprising:

a chassis comprising:

a frame having a front end and a rear end;

a pair of rear legs having a first end and a second end, the first end being pivotally coupled to the frame, each rear leg of the pair of rear legs having an outer shell having spaced apart sides forming an internal cavity and a rear wheel rotatably coupled to the outer shell; and a pair of front legs, each front leg directly pivotally coupled to a respective rear leg of the pair of rear legs, between the first end and the second end of the respective rear leg, and a front wheel coupled to each front leg of the pair of front legs, and wherein the pair of rear legs and the pair of front legs are retracted to the frame in a first transport condition usable as a car seat, and wherein the pair of rear legs and the pair of front legs are deployable away from the frame to a second transport condition usable as a stroller; and an infant car seat coupled to the chassis.

16. The assembly of claim 15, wherein at least a portion of the front wheels are nested within the internal cavity of the outer shell of the rear legs when in the first transport condition.

17. The assembly of claim 16, wherein each rear leg further comprises a hub having a hub extension including a locking notch, and wherein the chassis further comprises a first lock, the first lock aligning with and extending into the locking notch in the second transport condition to lock the rear legs in the second transport condition.

18. The assembly of claim 17, wherein each front leg further comprises a cam lobe projecting from the hub of the front leg, the system further comprising a release cam slidingly coupled to the hub of the rear leg, and wherein the cam lobe contacts the release cam as the front legs move from the second transport condition to the first transport condition to move the release cam into engagement with the first lock and moving the first lock out of engagement with the locking notch.

* * * * *